United States Patent
Rao et al.

(10) Patent No.: US 9,158,744 B2
(45) Date of Patent: Oct. 13, 2015

(54) SYSTEM AND METHOD FOR AUTOMATICALLY EXTRACTING MULTI-FORMAT DATA FROM DOCUMENTS AND CONVERTING INTO XML

(71) Applicant: Cognizant Technology Solutions India Pvt. Ltd., Chennai (IN)

(72) Inventors: Geelapaturu Subrahmanya Venkata Radha Krishna Rao, Chennai (IN); Parthasarathi Jinka, Chennai (IN); Venkatesh Srinivasan, Chennai (IN); Ramesh Selvaraj, Chennai (IN); Suresh Kumar Ramaswamy, Ariyalur District (IN); Dinesh Maroo, Chennai (IN)

(73) Assignee: Cognizant Technology Solutions India Pvt. Ltd. (IN)

( * ) Notice: Subject to any disclaimer, the term of this patent is extended or adjusted under 35 U.S.C. 154(b) by 318 days.

(21) Appl. No.: 13/799,555

(22) Filed: Mar. 13, 2013

(65) Prior Publication Data
US 2014/0195891 A1    Jul. 10, 2014

(30) Foreign Application Priority Data
Jan. 4, 2013    (IN) .............................. 38/CHE/2013

(51) Int. Cl.
*G06F 17/21*    (2006.01)
(52) U.S. Cl.
CPC .................................. *G06F 17/218* (2013.01)
(58) Field of Classification Search
CPC ............................................... G06F 17/30569
See application file for complete search history.

(56) References Cited

U.S. PATENT DOCUMENTS 5,191,525 A * 3/1993 LeBrun et al. ................ 715/229
6,819,736 B1 * 11/2004 Bruder et al. ................... 378/15
(Continued)

FOREIGN PATENT DOCUMENTS

| WO | 0203595 A2 | 1/2002 |
| WO | 2009059358 A1 | 5/2009 |

OTHER PUBLICATIONS

"MVR Sharing—A Dangerous Practice", published in the year 2004, retrieved from http://www.faia.com/Resource-Center/Education-Library/Auto-Insurance/MVR-Sharing---A-Dangerous-Practice/.*

(Continued)

*Primary Examiner* — Stephen Hong
*Assistant Examiner* — Sanchita Roy
(74) *Attorney, Agent, or Firm* — Lerner, David, Littenberg, Krumholz & Mentlik, LLP

(57) ABSTRACT

A system, a computer-implemented method and a computer program product for extracting insurance data from one or more documents having one or more file formats and converting into Extensible Markup Language (XML) format is provided. The system comprises a user interface configured to facilitate one or more users to submit one or more documents related to insurance. The system further comprises a business type classification module configured to identify the one or more submitted documents based on a business type. Further, the system comprises a format classification module configured to identify file format of the one or more submitted documents. Furthermore, the system comprises an extraction and conversion module configured to match one or more headers in the one or more submitted documents with one or more pre-stored headers, extract insurance data corresponding to the one or more matched headers and convert the extracted insurance data into XML format.

25 Claims, 11 Drawing Sheets

(56) References Cited

U.S. PATENT DOCUMENTS

| | | | |
|---|---|---|---|
| 2002/0194033 A1 | 12/2002 | Huff | |
| 2005/0201639 A1* | 9/2005 | Wu | 382/294 |
| 2005/0289182 A1* | 12/2005 | Pandian et al. | 707/104.1 |
| 2006/0075328 A1* | 4/2006 | Becker et al. | 715/503 |
| 2007/0118391 A1* | 5/2007 | Malaney et al. | 705/1 |
| 2007/0168382 A1* | 7/2007 | Tillberg et al. | 707/102 |
| 2009/0327321 A1* | 12/2009 | McCormack et al. | 707/101 |
| 2010/0125466 A1 | 5/2010 | Labelle et al. | |
| 2011/0258195 A1* | 10/2011 | Welling et al. | 707/740 |
| 2012/0201457 A1* | 8/2012 | Bart et al. | 382/176 |
| 2014/0029857 A1* | 1/2014 | Kompalli et al. | 382/212 |

OTHER PUBLICATIONS

Chethan ("Graphics Separation and Skew Correction for Mobile Captured Documents and Comparative analysis with Existing Methods"), retrieved from http://ijcaonline.net/volume7/number3/pxc3871495.pdf.*

"Statistics Canada: Formula 2 Minimum squared distance weighted by population", last modified Dec. 6, 2012, retrieved from http://www12.statcan.gc.ca/census-recensement/2011/ref/dict/figures/form2-dict-eng.cfm.*

* cited by examiner

SYSTEM AND METHOD FOR AUTOMATICALLY EXTRACTING MULTI-FORMAT DATA FROM DOCUMENTS AND CONVERTING INTO XML

FIELD OF THE INVENTION

The present invention relates generally to data management. More particularly, the present invention provides a system and method for automatically extracting insurance data and converting into Extensible Markup Language (XML) format.

BACKGROUND OF THE INVENTION

In insurance industry, huge amount of data is gathered from various sources for providing insurance policy quotes to customers. Further, the gathered data is usually in the form of numerous documents having varied file formats such as spreadsheet format, Portable Document Format (PDF) and image file format. Further, extracting relevant insurance data from multiple documents having varied file formats poses a lot of problem and takes a lot of time and effort. Furthermore, converting the extracted insurance data into appropriate format for uploading on insurance carrier systems is also cumbersome.

Conventionally, various systems and methods exist for extracting the insurance data from the one or more documents. For example, the insurance data can be manually extracted and uploaded in the insurance carrier systems. However, due to large volumes of the insurance data to be dealt with, manual extraction of the insurance data is prone to errors, leads to duplicate entries and critical data is often missed resulting in poor data quality and delay in risk assessment by the underwriters. Further, the underwriters' time is wasted in collecting correct insurance data for proper risk assessment thereby increasing costs for the insurance carriers. Also, there is a delay in providing insurance policy quotes to potential customers.

To overcome the above-mentioned disadvantages, various systems and methods exist for automatically extracting the insurance data from the one or more documents having specific file formats and converting the extracted insurance data into Extensible Markup Language (XML) format for uploading into the insurance carrier systems. However, the customers and the insurance agents submit the one or more documents in varied file formats which pose a problem as the existing systems and methods can process only certain specific file formats. The insurance data from the documents having the varied file formats is then manually extracted and uploaded on the insurance carrier systems leading to delays.

In light of the above, there is a need for a system and method for automatically extracting the insurance data from the one or more documents having varied file formats. Further, there is a need for a system and method for converting the extracted data into appropriate format such as XML format suitable to be uploaded into the insurance carrier systems to facilitate quick and accurate submission which will further facilitate the underwriters to focus on the more critical tasks such as risk assessment and relationship management. Furthermore, there is a need to provide the insurance policy quotes to the potential customers quickly to generate more business for the insurance carriers and minimizing missed business opportunities. In addition, there is a need for a system and method capable of supporting submissions via multiple submission channels across different lines of insurance business such as home insurance, car insurance, health insurance and life insurance. Also, there is a need for a system and method which is configurable and trainable to incorporate new file formats and new submission channels.

SUMMARY OF THE INVENTION

A system, a computer-implemented method and a computer program product for extracting insurance data from one or more documents having one or more file formats and converting into Extensible Markup Language (XML) format is provided. The system comprises a user interface configured to facilitate one or more users to submit one or more documents related to insurance. The system further comprises a business type classification module configured to identify the one or more submitted documents based on a business type. Further, the system comprises a format classification module configured to identify file format of the one or more submitted documents. Furthermore, the system comprises an extraction and conversion module configured to match one or more headers in the one or more submitted documents with one or more pre-stored headers corresponding to the identified business type, extract insurance data corresponding to the one or more matched headers and convert the extracted insurance data into XML format using one or more pre-stored XML elements corresponding to the one or more matched headers. The matching and extracting is based on the identified file format.

In an embodiment of the present invention, the extraction and conversion module comprises an image convertor configured to convert one or more Portable Document Format (PDF) files to one or more images if the identified file format of the one or more submitted documents is PDF. The extraction and conversion module further comprises an image processing module configured to process the one or more images to isolate one or more insurance data blocks. The one or more images are received from at least one of: the image convertor and directly from the one or more users after being identified by the format classification module. Further, the extraction and conversion module comprises a data extractor configured to extract the insurance data from at least one of: the isolated one or more insurance data blocks and one or more spreadsheets in the form of a two dimensional array if the identified file format of the one or more submitted documents is in a spreadsheet format. Furthermore, the extraction and conversion module comprises an XML convertor configured to convert the extracted insurance data using the one or more pre-stored XML elements.

In an embodiment of the present invention, the extraction and conversion module further comprises a data cleansing module configured to cleanse the extracted insurance data from the one or more spreadsheets. Further, the extraction and conversion module comprises a data structuring module configured to match the cleansed insurance data with the one or more pre-stored headers to identify header row, the one or more headers and the corresponding insurance data. In an embodiment of the present invention, cleansing the extracted insurance data comprises removing at least one of: rows and columns that contain data elements less than a predetermined threshold value, duplicate data and unwanted data.

In an embodiment of the present invention, processing the one or more images to isolate the one or more insurance data blocks by the image processing module comprises determining structure of the one or more images by matching the one or more images with one or more pre-stored empty templates corresponding to the identified business type, wherein if the one or more images match with the one or more pre-stored empty templates then the one or more images are considered to be structured. The processing of the one or more images by the image processing module further comprises correcting at least one of: rotation, scale and translation of the one or more structured images to fit the one or more matched empty templates. Further, processing the one or more images by the image processing module comprises matching the one or more headers from the one or more corrected images with the one or more pre-stored headers corresponding to the one or more matched empty templates. Furthermore, processing the one or more images by the image processing module comprises isolating the one or more insurance data blocks corresponding to the one or more matched headers from the one or more corrected structured images.

In an embodiment of the present invention, processing the one or more images to isolate the one or more insurance data blocks by the image processing module comprises determining structure of the one or more images by matching the one or more images with one or more pre-stored empty templates corresponding to the identified business type, wherein if the one or more images do not match with the one or more pre-stored empty templates then the one or more images are considered to be unstructured. The processing of the one or more images by the image processing module further comprises correcting rotation of the one or more unstructured images. Further, processing the one or more images by the image processing module comprises determining pattern of the one or more corrected unstructured images. The determined pattern is an arrangement of the one or more headers and the corresponding insurance data in the one or more corrected unstructured images. Furthermore, processing the one or more images by the image processing module comprises matching the one or more headers from the one or more corrected unstructured images with the one or more pre-stored headers using the determined pattern. In addition, processing the one or more images by the image processing module comprises isolating one or more insurance data blocks corresponding to the one or more matched headers from the one or more corrected unstructured images using the determined pattern.

In an embodiment of the present invention, the system further comprises a submission channels interface configured to facilitate submitting the one or more documents related to insurance directly via one or more submission channels. In an embodiment of the present invention, the one or more submission channels comprise at least one of: a facsimile, an e-mail, an instant message and a digital scanner. In an embodiment of the present invention, the business type refers to type of the one or more submitted documents corresponding to a line of insurance business comprising at least one of: Association for Cooperative Operations Research and Development (ACORD) forms, Cisgem forms, schedules, lossrun reports, Market Value Reduction (MVR) reports and addendums to insurance policy. In an embodiment of the present invention, the one or more images have one or more image file formats comprising at least one of: a Joint Photographic Experts Group (JPEG) format, a JPEG File Interchange Format (JFIF), an Exchangeable Image File Format (EXIF), a Tagged Image File Format (TIFF), a Graphics Interchange Format (GIF), a bitmap image file format, a Portable Network Graphics (PNG) format and any other image file format. In an embodiment of the present invention, the one or more spreadsheets have one or more spreadsheet formats comprising at least one of: a Microsoft® Excel® file format, an Open Document Format (ODF), a Lotus 1-2-3® worksheet format, a Microsoft® Works spreadsheet format, a VisiCalc® spreadsheet format, an Abykus worksheet format, an Ability spreadsheet format and any other spreadsheet format. In an embodiment of the present invention, each of the one or more pre-stored XML elements are XML transformations corresponding to the one or more pre-stored headers.

The computer-implemented method for extracting insurance data from one or more documents having one or more file formats and converting into XML format, via program instructions stored in a memory and executed by a processor, comprises submitting one or more documents related to insurance. The computer-implemented method further comprises identifying the one or more submitted documents based on a business type. Further, the computer-implemented method comprises identifying file format of the one or more submitted documents. Furthermore, the computer-implemented method comprises matching one or more headers in the one or more submitted documents with one or more pre-stored headers corresponding to the identified business type. The matching of one or more headers is based on the identified file format. Also, the computer-implemented method comprises extracting insurance data corresponding to the one or more matched headers. The extraction of the insurance data is based on the identified file format. In addition, the computer-implemented method comprises converting the extracted insurance data into XML format using one or more pre-stored XML elements corresponding to the one or more matched headers. In an embodiment of the present invention, the one or more documents are submitted via at least one of: a user interface and a submission channels interface.

In an embodiment of the present invention, the method for extracting the insurance data from the one or more documents having one or more file formats and converting into XML format further comprises converting one or more PDF files into one or more images if the identified file format of the one or more submitted documents is PDF. Further, the method for extracting the insurance data from the one or more documents having one or more file formats and converting into XML format comprises processing the one or more images to isolate one or more insurance data blocks. The one or more images comprise at least one of: the one or more converted images and the one or more submitted documents identified as the one or more images. Furthermore, the method for extracting the insurance data from the one or more documents having one or more file formats and converting into XML format comprises extracting the insurance data from the isolated insurance data blocks. In addition, the method for extracting the insurance data from the one or more documents having one or more file formats and converting into XML format comprises converting the extracted insurance data using the one or more pre-stored XML elements.

In an embodiment of the present invention, the step of processing the one or more images to isolate the one or more insurance data blocks further comprises determining structure of the one or more images by matching the one or more images with one or more pre-stored empty templates corresponding to the identified business type, wherein if the one or more images match with the one or more pre-stored empty templates then the one or more images are considered to be structured. Further, the step of processing the one or more images comprises correcting at least one of: rotation, scale and translation of the one or more structured images to fit the one or more matched empty templates. Furthermore, the step of processing the one or more images comprises matching the one or more headers from the one or more corrected structured images with the one or more pre-stored headers corresponding to the one or more matched empty templates. In addition, the step of processing the one or more images comprises isolating the one or more insurance data blocks corresponding to the one or more matched headers from the one or more corrected structured images.

In an embodiment of the present invention, the step of processing the one or more images to isolate the one or more insurance data blocks further comprises determining structure of the one or more images by matching the one or more images with one or more pre-stored empty templates corresponding to the identified business type, wherein if the one or more images do not match with the one or more pre-stored empty templates then the one or more images are considered to be unstructured. Further, the step of processing the one or more images comprises correcting rotation of the one or more unstructured images. Furthermore, the step of processing the one or more images comprises determining pattern of the one or more corrected unstructured images. The determined pattern is an arrangement of the one or more headers and the corresponding insurance data in the one or more corrected unstructured images. In addition, the step of processing the one or more images comprises matching the one or more headers from the one or more corrected unstructured images with the one or more pre-stored headers using the determined pattern. Also, the step of processing the one or more images comprises isolating the one or more insurance data blocks corresponding to the one or more matched headers from the one or more corrected unstructured images using the determined pattern.

In an embodiment of the present invention, the step of correcting the rotation of the one or more unstructured images comprises processing the one or more unstructured images using image thresholding to generate one or more binary images. The image thresholding facilitates image segmentation by converting the one or more unstructured images in the form of one or more gray scale images into the one or more binary images. The step of correcting the rotation of the one or more unstructured images further comprises dilating the one or more binary images using image dilation to generate one or more dilated images. Dilating the one or more binary images facilitates in expanding objects and shapes in the one or more binary images. Further, the step of correcting the rotation of the one or more unstructured images comprises processing the one or more dilated images using image thinning to generate the one or more thinned images. Thinning the one or more dilated images facilitates image skeletonization. Furthermore, the step of correcting the rotation of the one or more unstructured images comprises estimating a skew angle of the one or more thinned images using Hough transform. In addition, the step of correcting the rotation of the one or more unstructured images comprises correcting the rotation of the one or more thinned images based on the estimated skew angle to generate the one or more corrected unstructured images.

In an embodiment of the present invention, the method for extracting the insurance data from the one or more documents having one or more file formats and converting into XML further comprises extracting the insurance data from one or more spreadsheets in the form of a two dimensional array if the identified file format of the one or more submitted documents is in a spreadsheet format. Further, the method for extracting the insurance data from the one or more documents having one or more file formats and converting into XML format comprises cleansing the extracted insurance data. The extracted insurance data is cleansed by removing at least one of: rows and columns that contain data elements less than a predetermined threshold value, duplicate data and unwanted data. Furthermore, the method for extracting the insurance data from the one or more documents having one or more file formats and converting into XML format comprises matching the cleansed insurance data with the one or more pre-stored headers to identify header row, the one or more headers and the corresponding insurance data. Also, the method for extracting the insurance data from the one or more documents having one or more file formats and converting into XML format comprises matching the one or more headers in the header row with the one or more pre-stored headers, wherein if the one or more headers in the header row do not match with the one or more pre-stored headers then the one or more unmatched headers are renamed. Also, the method for extracting the insurance data from the one or more documents having one or more file formats and converting into XML format comprises converting the insurance data corresponding to at least one of: the one or more matched headers and the one or more renamed headers into XML format using the one or more pre-stored XML elements corresponding to the one or more matched headers and the one or more renamed headers respectively.

The computer program product for extracting insurance data from one or more documents having one or more file formats and converting into XML format comprising: a non-transitory computer-readable medium having computer-readable program code stored thereon, the computer-readable program code comprising instructions that when executed by a processor, cause the processor to submit one or more documents related to insurance. The processor further identifies the one or more submitted documents based on a business type. Further, the processor identifies file format of the one or more submitted documents. Furthermore, the processor matches one or more headers in the one or more submitted documents with one or more pre-stored headers corresponding to the identified business type, wherein the matching of one or more headers is based on the identified file format. Also, the processor extracts insurance data corresponding to the one or more matched headers, wherein the extraction of the insurance data is based on the identified file format. In addition, the processor converts the extracted insurance data into XML format using one or more pre-stored XML elements corresponding to the one or more matched headers.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and method for automatically extracting insurance data from documents having one or more file formats and converting the extracted insurance data into Extensible Markup Language (XML) format is described herein. The invention provides for a system and method capable of extracting the insurance data received via one or more disparate submission channels to increase underwriting efficiency and to provide insurance policy quotes to customers effectively. The invention further provides a robust, configurable and trainable system to incorporate new file formats and new submission channels.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
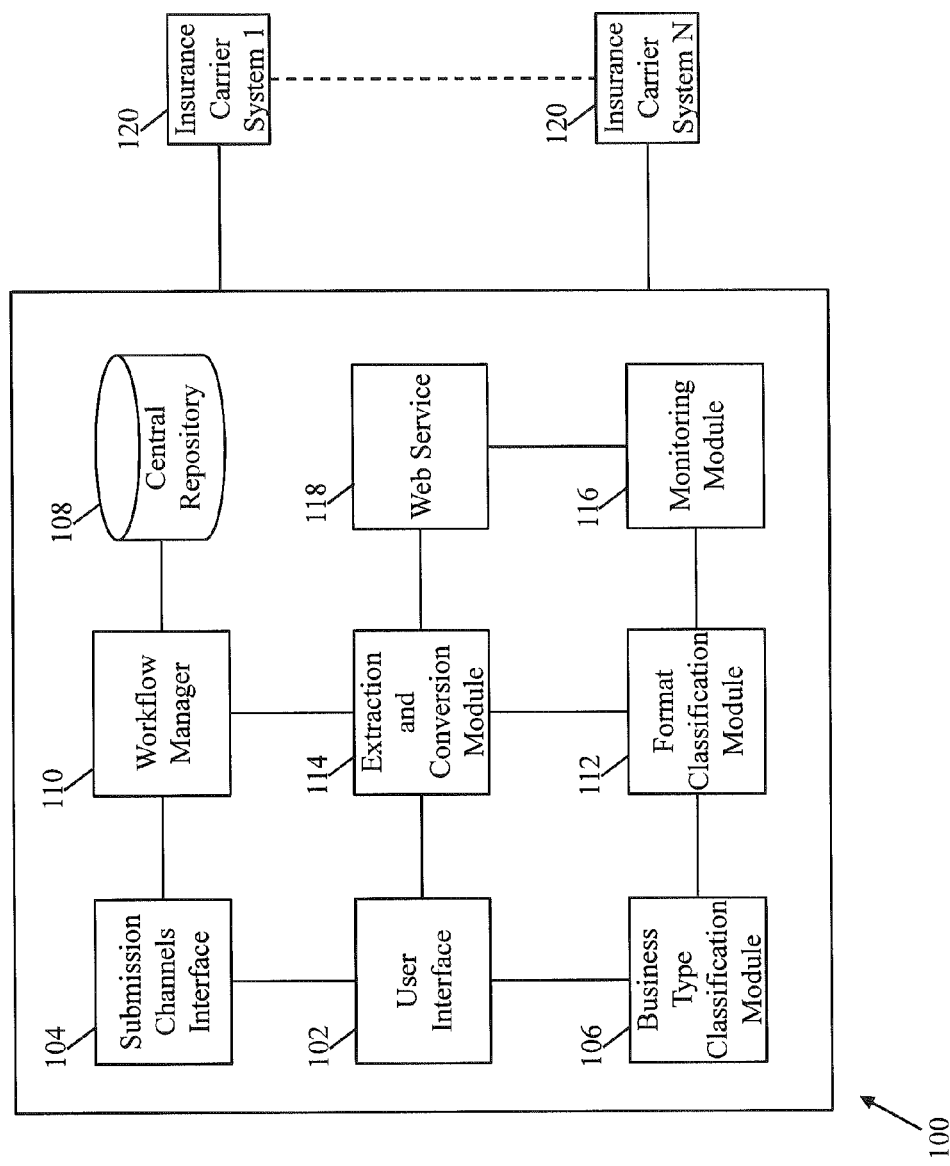
FIG. 1 is a block diagram illustrating a system for automatically extracting insurance data and converting into Extensible Markup Language (XML) format, in accordance with an embodiment of the present invention.

FIG. 1 is a block diagram illustrating a system 100 for automatically extracting insurance data and converting into Extensible Markup Language (XML) format, in accordance with an embodiment of the present invention. The system 100 comprises a user interface 102, a submission channels interface 104, a business type classification module 106, a central repository 108, a workflow manager 110, a format classification module 112, an extraction and conversion module 114, a monitoring module 116 and a web service 118. The system 100 is connected with one or more insurance carrier systems 120.

The user interface 102 is a front end interface configured to facilitate one or more users to access the system 100. The user interface 102 is further configured to facilitate the one or more users to submit one or more documents related to insurance to the system 100. Further, the one or more users can also check and monitor status of submissions and quality of the one or more submitted documents via the user interface 102.

In various embodiments of the present invention, the user interface 102 is an interactive interface such as, but not limited to, a Graphical User Interface (GUI), a character user interface and a touch screen interface. In an embodiment of the present invention, the one or more users include, but not limited to, insurance agents, insurance underwriters and insurance support staff. In an embodiment of the present invention, the one or more users accesses the user interface 102 via an electronic communication device including, but not limited to, a desktop, a notebook, a laptop, a mobile phone, a smart phone and a Personal Digital Assistant (PDA).

In an embodiment of the present invention, the one or more submitted documents related to insurance include, but not limited to, insurance application forms, Association for Cooperative Operations Research and Development (ACORD) forms, insurance history reports, financial statements, loss run reports, title reports, credit reports, driving records and medical history records. The ACORD forms are standardized insurance forms such as Form 72—property loss notice, Form 73—automobile loss notice, Form 82—auto accident information form, etc. developed by ACORD for insurance industry. Further, the one or more submitted documents can have various file formats such as, but not limited to, a spreadsheet format, a Portable Document Format (PDF), an image file format and a text file format. In an embodiment of the present invention, one or more image file formats include, but not limited to, a Joint Photographic Experts Group (JPEG) format, a JPEG File Interchange Format (JFIF), an Exchangeable Image File Format (EXIF), a Tagged Image File Format (TIFF), a Graphics Interchange Format (GIF), a bitmap image file format, a Portable Network Graphics (PNG) format and any other image file format. In another embodiment of the present invention, one or more spreadsheet formats include, but not limited to, a Microsoft® Excel® file format, an Open Document Format (ODF), a Lotus 1-2-3® worksheet format, a Microsoft® Works spreadsheet format, a VisiCalc® spreadsheet format, an Abykus worksheet format, an Ability spreadsheet format and any other spreadsheet format. In yet another embodiment of the present invention, one or more text file formats include, but is not limited to, a Microsoft® Word® format, an AbiWord document format, a rich text format and any other text file format. In an embodiment of the present invention the one or more users may submit scanned hard copies of the one or more documents in the image file format or the PDF.

The submission channels interface 104 is configured to facilitate submitting the one or more documents related to insurance via one or more submission channels to the system 100. The one or more submission channels include, but not limited to, facsimile, email, instant message and image scanner. In an embodiment of the present invention, the submission channels interface 104 facilitates the one or more users to configure their email or fax accounts with the system 100 via the user interface 102. Further, configuring email or fax accounts with the system 100 facilitates submitting the one or more documents received on email or fax accounts of the one or more users directly on the system 100 without user-intervention. The one or more documents submitted via the user interface 102 and directly via the submission channels interface 104 are stored in the central repository 108 for extracting the insurance data.

The business type classification module 106 is configured to identify and classify the one or more submitted documents based on a line of business and a business type. The line of business refers to a general classification of businesses in insurance industry including, but not limited to, commercial insurance, health insurance, property insurance and automobile insurance. The business type refers to type of the one or more submitted documents corresponding to a particular line of insurance business such as, but not limited to, ACORD forms, cisgem forms, schedules, lossrun reports, Market Value Reduction (MVR) reports and addendums to insurance policy.

In an embodiment of the present invention, the business type classification module 106 provides a list of line of businesses and business types corresponding to each of the one or more submitted documents via the user interface 102. Further, the one or more users identify and classify the one or more submitted documents by selecting the appropriate line of business corresponding to the one or more submitted documents. The one or more users then identify and classify each of the one or more submitted documents based on the business type via the user interface 102. Further, identifying the one or more submitted documents based on the business type facilitates in extraction of the insurance data by the extraction and conversion module 114.

In an exemplary embodiment of the present invention, the one or more submitted documents related to automobile insurance may be identified and classified based on the business type such as, but not limited to, an automobile loss notice, an auto accident information form, vehicle or equipment certificate of insurance and vehicle schedule by the one or more users via the user interface 102. In another exemplary embodiment of the present invention, the one or more submitted documents related to property insurance may be identified and classified based on the business type such as, but not limited to, flood insurance selection/rejection form, vacant building supplement form and apartment building supplement form.

The workflow manager 110 facilitates controlling and tracking the progress of workflow between various components of the system 100. The workflow manager 110 facilitates controlling various tasks of the system 100 including, but not limited to, submitting the one or more documents via the user interface 102 and the submission channels interface 104, classifying the one or more submitted documents based on the identified file format, extracting relevant insurance data from the one or more submitted documents, converting the one or more submitted documents in PDF to an image file format and converting the extracted data into XML format. The workflow manager 110 also tracks number of transactions performed by the system 100.

The format classification module 112 is configured to identify file formats of the one or more submitted documents. In an embodiment of the present invention, the one or more submitted documents may have one or more file formats including, but not limited to, a spreadsheet format, a PDF, an image file format and a text file format. In an embodiment of the present invention, the format classification module 112 identifies the file format using file extension of each of the one or more submitted documents.

In an embodiment of the present invention, if the file extension of the one or more submitted documents is .pdf, then the one or more submitted documents are identified as one or more PDF files. In another embodiment of the present invention, if the file extension of the one or more submitted documents corresponds to including, but not limited to, .jpg, .gif, .tif, .png, .bmp and any other image file extension then the one or more submitted documents are identified as one or more images. In yet another embodiment of the present invention, if the file extension of the one or more submitted documents corresponds to including, but not limited to, .xls, .xlr, .123, .vc and any other spreadsheet file extension then the one or more submitted documents are identified as one or more spreadsheets. In yet another embodiment of the present invention, if the file extension of the one or more submitted documents includes, but not limited to, .doc, .docx, .rtf, .abw, .txt and any other text file extension then the one or more submitted documents are identified as one or more text files.

In an embodiment of the present invention, the format classification module 112 comprises one or more file type detection algorithms to identify the file format of the one or more submitted documents using the file extensions. Further, identifying the file format of the one or more submitted documents facilitates in determining the type of algorithms to be used for extracting the insurance data from the one or more submitted documents.

The extraction and conversion module 114 is configured to match one or more headers in the one or more submitted documents with one or more pre-stored headers corresponding to the identified business type based on the identified file format. The extraction and conversion module 114 is further configured to extract the insurance data corresponding to the matched one or more headers based on the identified file format using various data extraction techniques including, but not limited to, optical character recognition algorithms and various MATLAB functions. In an embodiment of the present invention, the insurance data comprises information required by the one or more insurance carrier systems 120 for generating insurance quotes for potential customers. The information includes, but is not limited to, previous insurance history, employment details, coverage desired and coverage preferences. This will be explained in detail in later sections of the specification.

Once data extraction is completed, the extraction and conversion module 114 converts the extracted insurance data into XML format using one or more pre-stored XML elements corresponding to the one or more matched headers. This will be explained in detail in later sections of the specification.

The monitoring module 116 is configured to track and monitor quality of the insurance data extracted and converted into XML format by the extraction and conversion module 114. Further, the monitoring module 116 is also configured to monitor quality of the one or more documents that are submitted via the user interface 102 and the submission channels interface 104. In an embodiment of the present invention, the monitoring module 116 monitors the quality of the one or more submitted documents identified as the one or more images using various image quality parameters such as, but not limited to, Dots Per Inches (DPI) level, pixel density and image color.

The web service 118 is configured to facilitate communication between the extraction and conversion module 114 and the one or more insurance carrier systems 120. Further, the converted insurance data is uploaded by the extraction and conversion module 114 via the web service 118 onto the one or more insurance carrier systems. In an embodiment of the present invention, the web service 118 facilitates the communication via internet.

The one or more insurance carrier systems 120 are existing systems employed by various insurance carriers onto which the converted insurance data is uploaded in XML format. In an embodiment of the present invention, the one or more insurance carrier systems 120 comprise XML databases to store the converted insurance data in XML format. Further, the stored data is used by the insurance carriers to manage various insurance processes such as, but not limited to, underwriting, providing insurance quotes, risk assessment and customer service.

Figure 2:
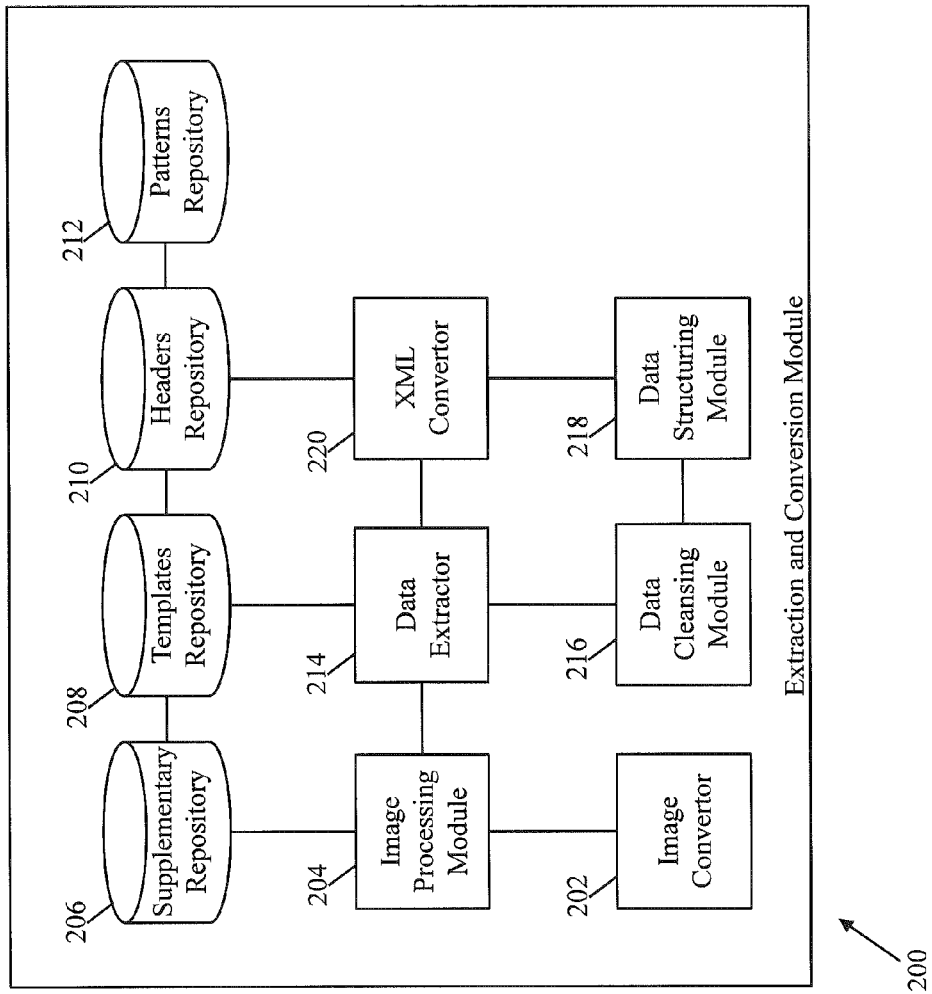
FIG. 2 is a detailed block diagram illustrating an extraction and conversion module for automatically extracting insurance data and converting into Extensible Markup Language (XML) format, in accordance with an embodiment of the present invention.

FIG. 2 is a detailed block diagram illustrating an extraction and conversion module 200 for automatically extracting insurance data and converting into Extensible Markup Language (XML) format, in accordance with an embodiment of the present invention. The extraction and conversion module 200 comprises an image convertor 202, an image processing module 204, a supplementary repository 206, a templates repository 208, a headers repository 210, a patterns repository 212, a data extractor 214, a data cleansing module 216, a data structuring module 218 and an XML convertor 220.

The image convertor 202 is configured to convert the one or more PDF files to one or more images if the file format of the one or more submitted documents is identified as PDF by the format classification module 112 (FIG. 1). In an embodiment of the present invention, data from the one or more PDF files is extracted for image conversion. Further, the one or more PDF files are recreated as the one or more image files using various image processing algorithms and conversion algorithms stored in the supplementary repository 206. The extracted data is then entered in the recreated one or more image files to complete the process of converting the one or more PDF files to the one or more images. In an embodiment of the present invention, the image convertor 202 may be a third party tool such as, but not limited to, Faceless PDF library for converting the one or more PDF files to the one or more images. In another embodiment of the present invention, the image convertor 202 also facilitates converting the one or more text files into the one or more images. Once the one or more PDF files and the one or more text files are converted into the one or more images, the control is transferred to the image processing module 204.

The image processing module 204 is configured to process the one or more images to isolate one or more insurance data blocks. The one or more images are received from at least one of: the image convertor 202 and directly from the one or more users after being identified by the format classification module 112 (FIG. 1). In an embodiment of the present invention, the image processing module 204 comprises algorithms to determine the structure of the one or more images by matching the structure of the one or more images with one or more pre-stored empty templates corresponding to the identified business type stored in the templates repository 208. In an embodiment of the present invention, if the structure of the one or more images does not match a pre-stored empty template, then the one or more images are considered to be unstructured. In another embodiment of the present invention, if the structure of the one or more images matches a pre-stored empty template, then the one or more images are considered to be structured.

In an embodiment of the present invention, a structured image has a pre-defined and standard pattern corresponding to existing forms and documents used in the insurance industry such as, but not limited to, ACORD forms, Applied forms, Cisgem forms and schedules. In an embodiment of the present invention, an unstructured image does not have a pre-defined pattern. Further, unstructured images include insurance related documents such as, but not limited to, loss-run reports, addendums and MVR reports.

In an embodiment of the present invention, if the one or more images are unstructured, then the image processing module 204 corrects rotation of the one or more unstructured images using various image processing techniques and algorithms such as, but not limited to, skew angle estimation techniques, image thresholding, image dilation, image thinning and Hough transform. Once the one or more unstructured images are corrected, the image processing module 204 determines the pattern of the one or more unstructured images using a set of algorithms stored in the patterns repository 212. The determined pattern is an arrangement of the one or more headers and the corresponding insurance data in the one or more corrected unstructured images. Further, the set of algorithms to determine the pattern of the one or more unstructured images include, but not limited to, algorithms to determine spatial mean and minimum mean square distance. Once the pattern of the one or more unstructured images is determined, the one or more headers from the one or more corrected unstructured images are matched with the one or more pre-stored headers in the headers repository 210 using the determined pattern. Further, the one or more insurance data blocks corresponding to the one or more matched headers are then isolated by the image processing module 204 using the determined pattern. The isolated one or more insurance data blocks are then sent to the data extractor 214 for the insurance data extraction.

If the one or more images are structured, then the image processing module 204 corrects at least one of: Rotation, Scale and Transformation (RST) of the one or more structured images. In an embodiment of the present invention, the RST of the one or more structured images is corrected using RANdom SAmple Consensus (RANSAC) technique.

Once the one or more structured images are corrected, the image processing module 204 matches the one or more headers in the one or more corrected structured images with the one or more pre-stored headers corresponding to the one or more matched empty templates having structure similar to the one or more structured images. The image processing module 204 then isolates the one or more insurance data blocks corresponding to the one or more matched headers from the one or more corrected structured images. The image processing module 204 isolates the one or more insurance data blocks by using position information corresponding to the one or more matched headers and various image splitting algorithms and filters. Further, the one or more isolated insurance data blocks are then sent to the data extractor 214 for extracting the insurance data.

The supplementary repository 206 is configured to store various algorithms and filters including, but not limited to, image processing algorithms and filters, image thresholding algorithms, image dilation algorithms, image thinning algorithms, image structuring algorithms, image splitting filters and algorithms, conversion algorithms and various other custom algorithms.

The templates repository 208 is configured to store the one or more pre-stored empty templates. The one or more pre-stored empty templates correspond to one or more documents related to insurance having a specific business type. Further, the one or more submitted documents that are filled and contain the insurance data are compared with the one or more pre-stored empty templates to extract the insurance data. In an embodiment of the present invention, the image processing module 204 determines the structure of the one or more images using the one or more pre-stored empty templates.

The headers repository 210 is configured to store headers and position information for all the documents related to insurance having various business types. Further, the one or more pre-stored headers and position information facilitate in extracting the insurance data by identifying the one or more headers and the corresponding insurance data in the one or more submitted documents. In an embodiment of the present invention, the one or more headers corresponding to each of the one or more documents related to insurance having specific business type are pre-stored in the headers repository. Further, the one or more headers associated with the one or more pre-stored empty templates are also stored in the headers repository 210.

The patterns repository 212 is configured to store algorithms that help in determining the pattern of the one or more unstructured images including, but not limited to, algorithms to determine spatial mean and minimum mean square distance.

The data extractor 214 is configured to extract the insurance data from the isolated insurance data blocks received from the image processing module 204. Prior to data extraction, the isolated insurance data blocks are preprocessed and undergo noise removal. In an embodiment of the present invention, noise removal is performed by using one or more MATLAB functions that help in minimizing the noise components in the isolated insurance data blocks. In an embodiment of the present invention, the data extractor 214 comprises an Optical Character Recognition (OCR) engine which facilitates extracting the insurance data. Further, the OCR engine comprises OCR algorithms that facilitate electronic conversion of text present in the isolated one or more insurance data blocks into machine-encoded text. In an exemplary embodiment of the present invention, the OCR engine used for data extraction includes, but is not limited to, Tessaract-OCR. Once the insurance data from the one or more insurance data blocks (corresponding to the one or more unstructured images and the one or more structured images) is extracted, the extracted insurance data is sent to the XML convertor 220 for conversion into XML format.

The data extractor 214 is also configured to receive the one or more spreadsheets from the format classification module 112 (FIG. 1) if the identified file format of the one or more submitted documents is in the spreadsheet format. In an embodiment of the present invention, the data extractor 214 extracts the insurance data from the one or more spreadsheets in the form of a Two-Dimensional (2D) array using various MATLAB functions. Once the insurance data is extracted from the one or more spreadsheets, the control is transferred to the data cleansing module 216.

The data cleansing module 216 is configured to cleanse the extracted insurance data from the one or more spreadsheets. The data cleansing module helps in detecting and correcting inaccurate data in the extracted 2D array comprising the extracted insurance data. In an embodiment of the present invention, the data cleansing module 216 cleanses the extracted insurance data by removing unwanted data, duplicate data and rows and columns that contain data elements less than a predetermined threshold value. Once the extracted insurance data from the one or more spreadsheets is cleansed, control is transferred to data structuring module 218 to structure the cleansed data.

The data structuring module 218 is configured to match the cleansed insurance data with the one or more pre-stored headers in the headers repository 210 to identify the header row, one or more headers and the corresponding insurance data in the cleansed insurance data. Further, the one or more headers in the header row are matched with the one or more pre-stored headers to facilitate conversion of the insurance data corresponding to the matched one or more headers into XML format. In an embodiment of the present invention, if the one or more headers in the header row do not match with the one or more pre-stored headers in the headers repository 210 then the one or more unmatched headers are renamed to facilitate conversion of the insurance data corresponding to the renamed headers into XML format.

The XML convertor 220 is configured to convert the extracted insurance data corresponding to the one or more images and the one or more spreadsheets into XML format. Further, converting the extracted insurance data in XML format helps in automatically uploading the converted data into the one or more insurance carrier systems 120 (FIG. 1).

The XML convertor 220 receives the extracted insurance data corresponding to the one or more pre-stored matched headers from the data extractor 214. The XML convertor 220 also receives the insurance data corresponding to the one or more pre-stored matched headers and renamed headers from the data structuring module 218. Each of the one or more pre-stored matched headers and the renamed headers has their corresponding XML elements pre-stored in the supplementary repository 206. In an embodiment of the present invention, the received insurance data is converted to XML format using a technology stack known as Extensible Stylesheet Language Transformations (XSLT) comprising numerous transformation files for each of one or more pre-stored XML elements. The one or more pre-stored XML elements corresponding to the one or more pre-stored headers are XML transformations of each of the one or more pre-stored headers. Further, the XML transformations are stored in the transformation files. Furthermore, the received insurance data is converted into XML format by referring to the transformation files corresponding to the one or more pre-stored XML elements. Once the received insurance data is converted into XML format, the converted data is uploaded onto the one or more insurance carrier systems 120 (FIG. 1).

Figure 3:
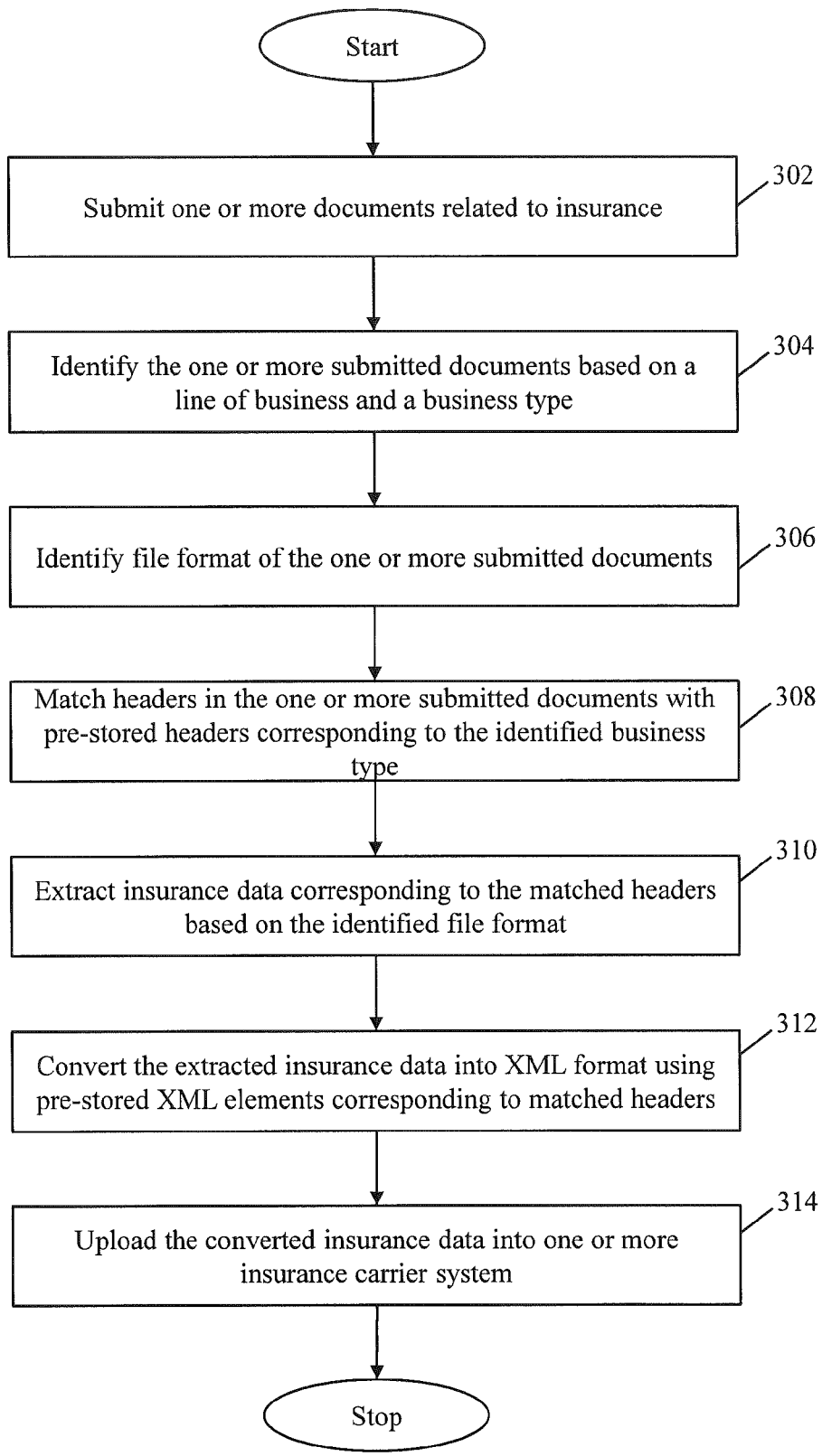
FIG. 3 is a flowchart illustrating a method for automatically extracting insurance data and converting into Extensible Markup Language (XML) format, in accordance with an embodiment of the present invention.
Figure 4A:
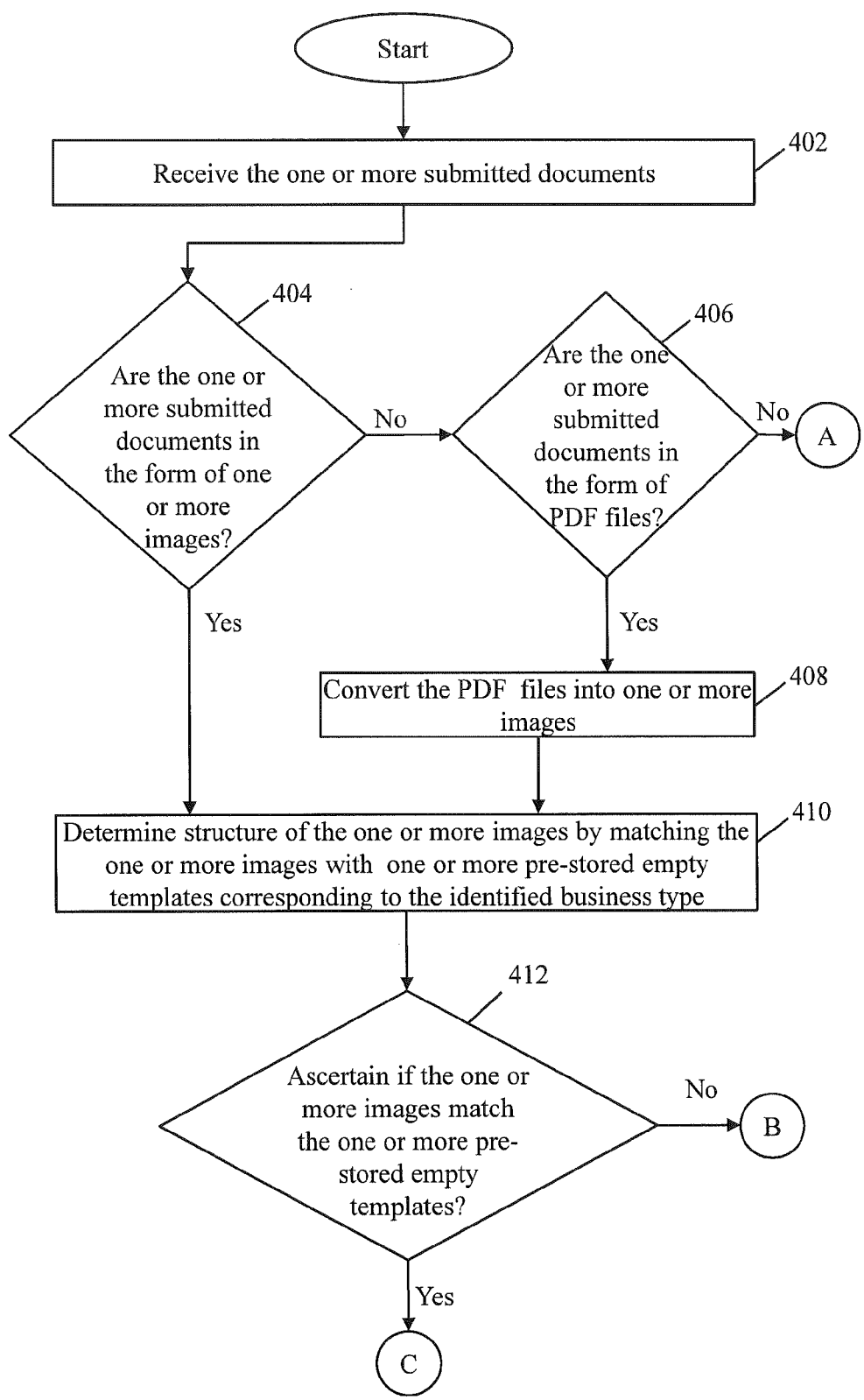
FIGS. 4A, 4B, 4C and 4D illustrate a detailed flowchart for extracting insurance data and converting into Extensible Markup Language (XML) format, in accordance with an embodiment of the present invention.
Figure 4B:
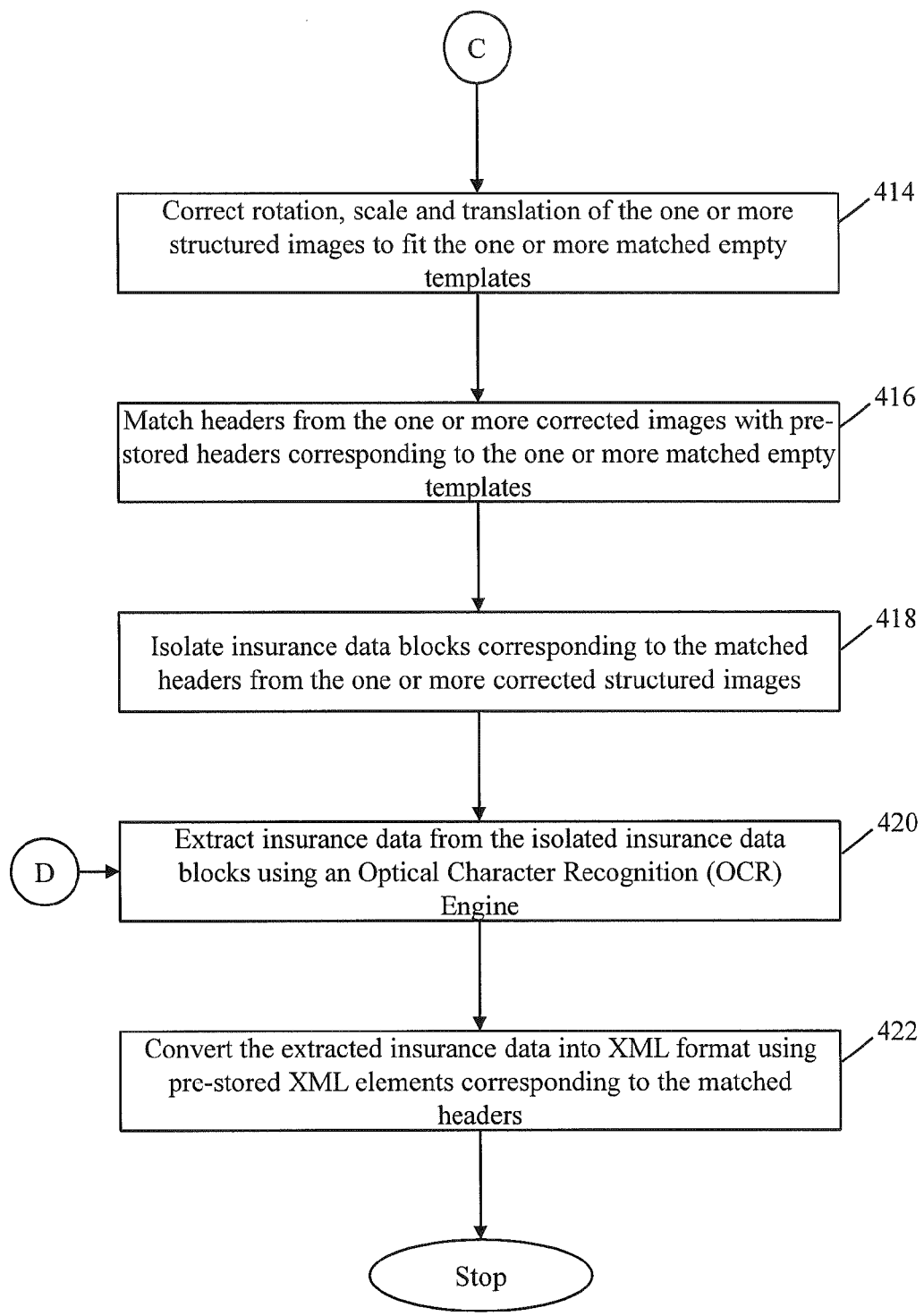
Figure 4C:
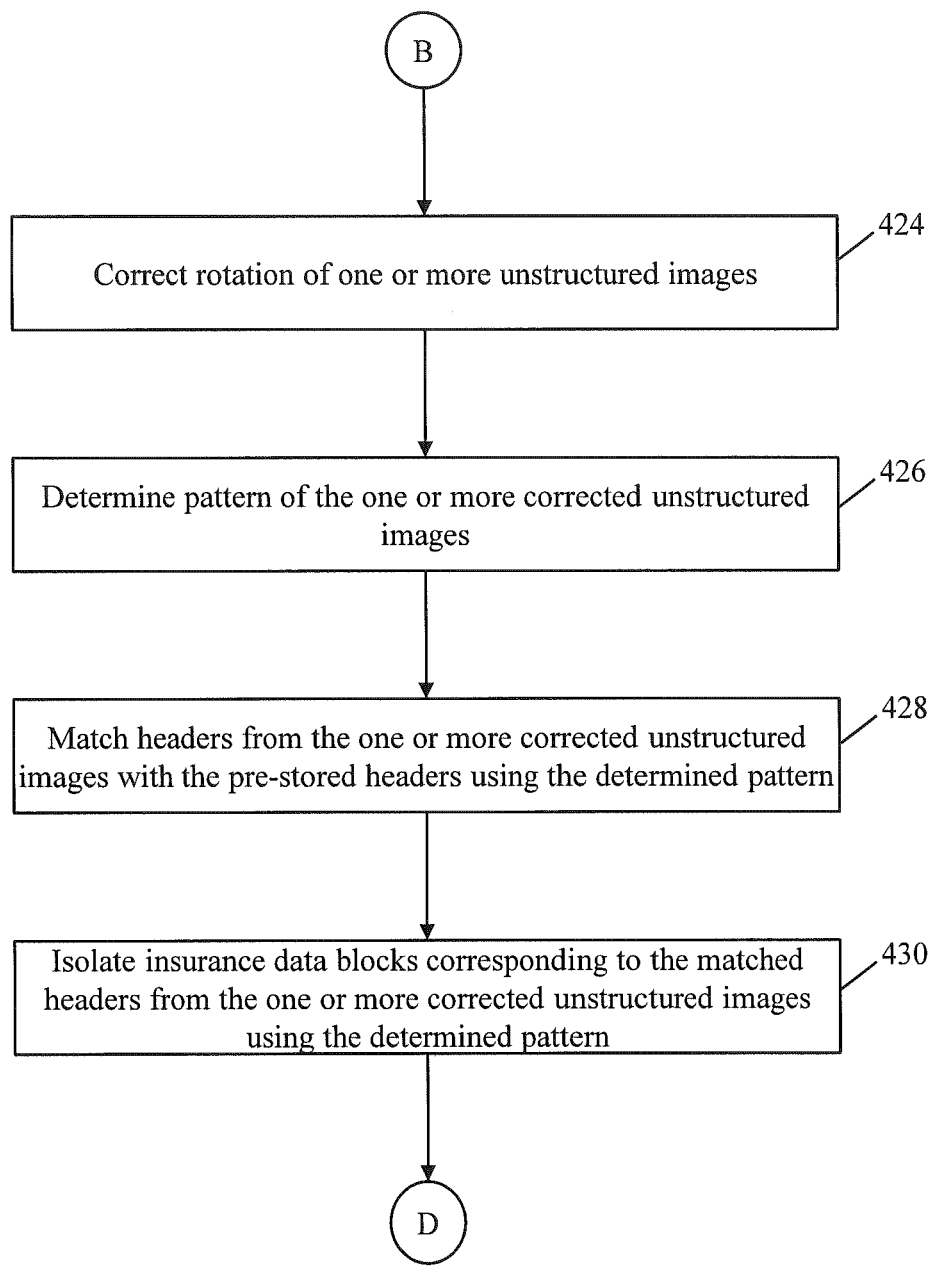
Figure 4D:
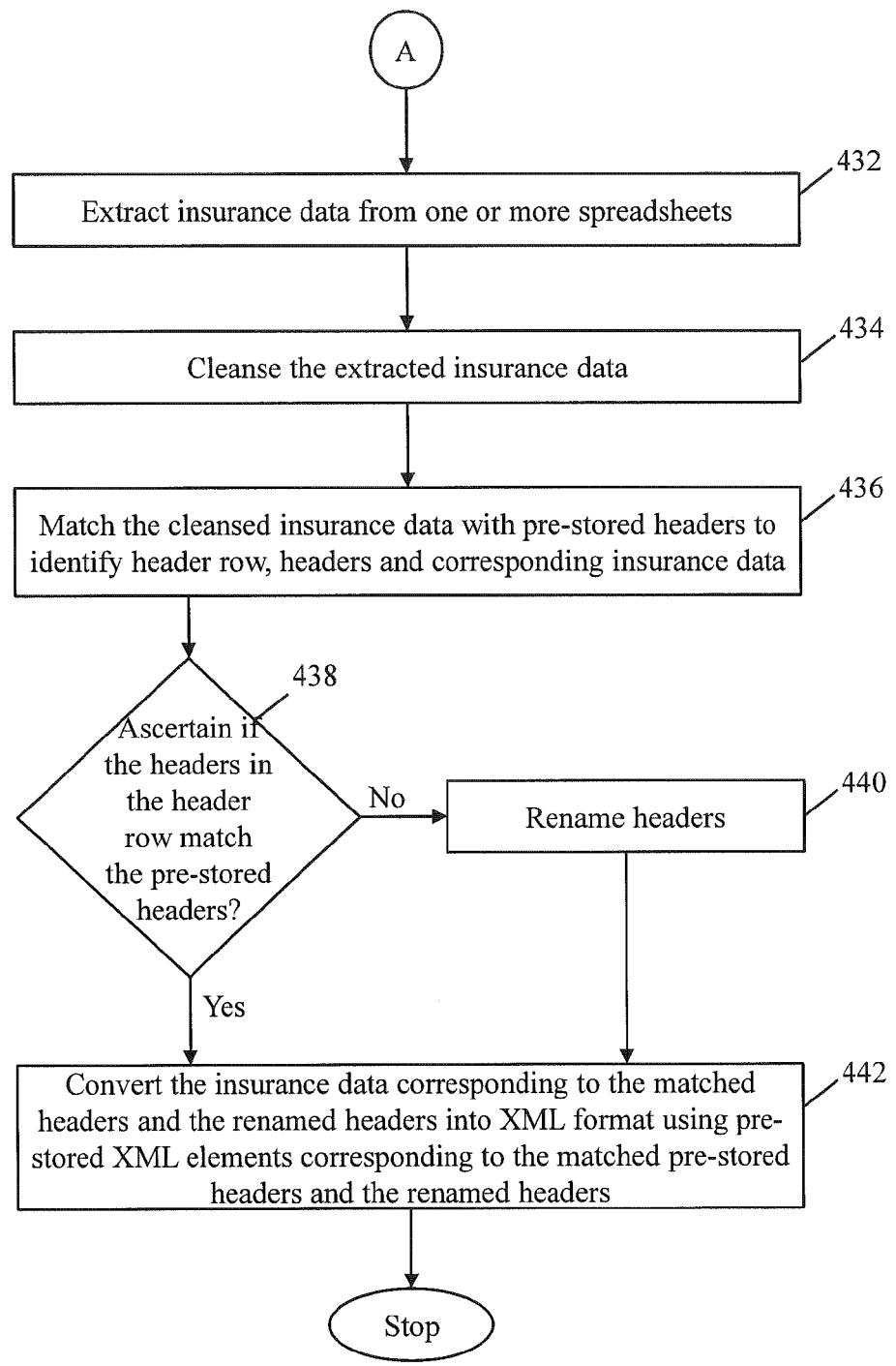

FIG. 3 is a flowchart illustrating a method for automatically extracting insurance data and converting into Extensible Markup Language (XML) format, in accordance with an embodiment of the present invention.

At step 302, one or more insurance related documents are submitted. In an embodiment of the present invention, the one or more documents related to insurance are submitted via a user interface by one or more users. The one or more users include, but not limited to, insurance agents, underwriters and support staff. In another embodiment of the present invention, the one or more documents related to insurance are submitted directly via one or more submission channels such as, but not limited to, fax, e-mail, instant messaging and digital scanner without user intervention. In an embodiment of the present invention, the one or more submitted documents are stored in a central repository for further processing.

At step 304, the one or more submitted documents are identified based on a line of business and a business type by the one or more users. In various embodiments of the present invention, the line of business refers to a general classification of businesses in insurance industry including, but not limited to, life insurance, health insurance, commercial insurance and automobile insurance. The business type refers to type of the one or more submitted documents corresponding to the line of business including, but not limited to, ACORD forms, Cisgem forms, schedules, lossrun reports, Market Value Reduction (MVR) reports and addendums to insurance policy. In an embodiment of the present invention, the one or more users select the appropriate line of business and the business type for the one or more submitted documents via the user interface to facilitate identifying the one or more submitted documents.

At step 306, file format of the one or more submitted documents is identified. In an embodiment of the present invention, the one or more submitted documents may have one or more file formats including, but not limited to, a spreadsheet format, a PDF, an image file format and a text file format. In an embodiment of the present invention, the file format is identified using file extension of each of the one or more submitted documents. Further, identifying the file format of the one or more submitted documents facilitate in determining the type of algorithms to be used for extracting insurance data from the one or more submitted documents.

At step 308, one or more headers in the one or more submitted documents are matched with one or more pre-stored headers corresponding to the identified business type. Further, matching of the one or more headers with the one or more pre-stored headers is based on the identified file format.

At step 310, insurance data corresponding to the one or more matched headers is extracted. Further the extraction of the insurance data is based on the identified file format. In an embodiment of the present invention, the insurance data is extracted using various data extraction techniques such as, but not limited to, Optical Character Recognition (OCR) and various MATLAB functions.

At step 312, the extracted insurance data is converted into XML format using one or more pre-stored XML elements corresponding to the one or more matched headers.

At step 314, the converted insurance data is uploaded into one or more insurance carrier systems in XML format. The one or more insurance carrier systems are existing systems employed by various insurance carriers onto which the converted insurance data is uploaded in XML format. In an embodiment of the present invention, the one or more insurance carrier systems comprise XML databases to store the converted insurance data in XML format. Further, the stored data is used by the one or more insurance carriers to manage various insurance processes such as, but not limited to, underwriting, providing insurance quotes, risk assessment and customer service.

FIGS. 4A, 4B, 4C and 4D illustrate a detailed flowchart for extracting insurance data and converting into Extensible Markup Language (XML) format, in accordance with an embodiment of the present invention.

At step 402, the one or more submitted documents are received. At step 404, a check is performed to ascertain whether the one or more submitted documents are in the form of one or more images. In an embodiment of the present invention, the file extension of the one or more submitted documents is used to ascertain the file formats of the one or more submitted documents. In an embodiment of the present invention, the one or more image file formats include, but not limited to, Joint Photographic Experts Group (JPEG) format, JPEG File Interchange Format (JFIF), Exchangeable Image File Format (EXIF), Tagged Image File Format (TIFF), Graphics Interchange Format (GIF), Bitmap Image file format and Portable Network Graphics (PNG) format.

If it is ascertained that the one or more submitted documents are not in the form of one or more images, then at step 406, a check is performed to ascertain whether the one or more submitted documents are in the form of one or more PDF files. If the file format of the one or more submitted documents is PDF, then at step 408 one or more PDF files are converted into the one or more images. In an embodiment of the present invention, the one or more PDF files are converted into the one or more images using various conversion algorithms. Once the one or more PDF files are converted into the one or more images, control is transferred to step 410 for processing the one or more images to isolate one or more insurance data blocks.

Previously at step 404, if it is ascertained that the one or more submitted documents are in the form of one or more images then also the control is transferred to step 410 for processing the one or more images to isolate the one or more insurance data blocks.

At step 410, structure of the one or more images is determined by matching the one or more images with one or more pre-stored empty templates corresponding to the identified line of business and the business type.

The one or more pre-stored empty templates are blank insurance related forms that are pre-stored in a templates repository. Further, each of the one or more pre-stored empty templates comprise one or more headers and empty space for the insurance data corresponding to the one or more headers. In an embodiment of the present invention, various data structuring algorithms are used to match the one or more images with the one or more pre-stored empty templates. Further, if the one or more headers corresponding to a pre-stored empty template match with the one or more headers in the one or more images then the one or more images are considered as structured.

At step 412, a check is performed to ascertain whether the structure of the one or more images matches the one or more pre-stored empty templates. If it is ascertained that the structure of the one or more images matches the one or more pre-stored empty templates, then at step 414, the Rotation, Scale and Translation (RST) of the one or more structured images is corrected to fit the one or more matched empty templates. In an embodiment of the present invention, the RST of the one or more structured images is corrected using RANdom SAmple Consensus (RANSAC) technique.

At step 416, one or more headers from the one or more corrected structured images are matched with the one or more pre-stored headers corresponding to the one or more matched empty templates. Each of the one or more pre-stored empty templates has its corresponding headers that are pre-stored in a header repository. In an embodiment of the present invention, various algorithms are used for matching the one or more headers in the one or more corrected structured images with the one or more pre-stored headers.

At step 418, the one or more insurance data blocks corresponding to the matched headers from the one or more corrected structured images are isolated. The one or more insurance data blocks are isolated from the one or more corrected structured images by comparing the one or more corrected structured images with the one or more pre-stored empty templates. The one or more corrected structured images contain the insurance data in contrast with the one or more matched pre-stored empty templates which are blank. The one or more headers corresponding to the matched pre-stored templates have corresponding pre-stored position information which helps in identifying and isolating the one or more insurance data blocks. Further, the position information includes, but is not limited to, contents to be extracted and spatial position of the information corresponding to the one or more headers. Once the one or more insurance data blocks from the one or more corrected structured images are isolated, the control is transferred to step 420 for extracting the insurance data.

At step 412, if it is ascertained that the structure of the one or more images does not match with the one or more pre-stored empty templates, then at step 424 rotation of one or more unstructured images is corrected. In an embodiment of the present invention, the rotation of the one or more unstructured images is corrected using various image processing algorithms and techniques including, but not limited to, image thresholding, image thinning, image dilation and Hough transform. Once the rotation of the one or more unstructured images is corrected, the control is transferred to step 426.

At step 426, pattern of the one or more corrected unstructured images is determined. In an embodiment of the present invention, the pattern is an arrangement of the one or more headers and the corresponding insurance data in the one or more corrected unstructured images. Further, determining the pattern of the one or more corrected unstructured images helps in identifying the one or more headers and the one or more corresponding insurance data blocks. In various embodiments of the present invention, numerous algorithms are used to determine the pattern of the one or more corrected unstructured images such as, but not limited to, algorithms to determine spatial mean and minimum mean square distance. Further, determining spatial mean and minimum mean square distance helps in determining the spatial position of the one or more headers and the corresponding insurance data in the one or more corrected unstructured images.

At step 428, the one or more headers from the one or more corrected unstructured images are matched with the one or more pre-stored headers using the determined pattern. In an embodiment of the present invention, various algorithms are used to match the one or more headers in the one or more corrected unstructured images with the one or more pre-stored headers.

At step 430, the one or more insurance data blocks corresponding to the one or more matched headers from the one or more corrected unstructured images are isolated using the determined pattern. Further, the position information corresponding to the one or more matched headers stored in a headers repository facilitates in isolating the one or more insurance data blocks by identifying spatial position of the one or more insurance data blocks. Once the one or more insurance data blocks from the one or more corrected unstructured images are isolated, the control is transferred to step 420 for extracting the insurance data.

At step 420, the insurance data from the isolated insurance data blocks is extracted using an Optical Character Recognition (OCR) engine. Prior to data extraction, the isolated insurance data blocks are preprocessed and undergo noise removal. In an embodiment of the present invention, noise removal is performed by using one or more MATLAB functions that help in minimizing the noise components in the isolated insurance data blocks. In an embodiment of the present invention, the OCR engine comprises various OCR algorithms that facilitate electronic conversion of text present in the isolated insurance data blocks into machine-encoded text. In an exemplary embodiment of the present invention, the OCR engine used for data extraction includes, but is not limited to, Tessaract-OCR. Once the insurance data from the one or more insurance data blocks (corresponding to the one or more unstructured images and the one or more structured images) is extracted, control is transferred to step 422.

At step 422, the extracted insurance data is converted into XML format using the one or more pre-stored XML elements corresponding to the one or more pre-stored matched headers. In an embodiment of the present invention, the extracted insurance data is converted to XML format using a technology stack known as Extensible Stylesheet Language Transformations (XSLT) comprising numerous transformation files for each of the one or more pre-stored XML elements. Further, the extracted insurance data is converted into XML format by referring to the transformation files corresponding to the one or more pre-stored XML elements.

Previously at step 406, if it is ascertained that the one or more submitted documents are not PDF files, then at step 432, the insurance data from the one or more spreadsheets is extracted. In an embodiment of the present invention, if the file extension of the one or more submitted documents corresponds to one or more spreadsheet formats, then the one or more submitted documents are identified as one or more spreadsheets.

In an embodiment of the present invention, the insurance data is extracted from the one or more spreadsheets in the form of a Two-Dimensional (2D) array using various MATLAB functions. Once the insurance data is extracted from the one or more spreadsheets, the control is transferred to step 434.

At step 434, the extracted insurance data is cleansed. The extracted insurance data is cleansed to detect and correct inaccurate data in the extracted 2D array. In an embodiment of the present invention, the extracted insurance data is cleansed by removing unwanted data, duplicate data, and rows and columns that contain data elements less than a predetermined threshold value. Once the extracted data from the one or more spreadsheets is cleansed, control is transferred to step 436.

At step 436, the cleansed insurance data is matched with the one or more pre-stored headers to identify header row, one or more headers and corresponding insurance data in the cleansed insurance data. Further, identifying the header row, the one or more headers and the corresponding insurance data in the cleansed insurance data facilitates in converting the insurance data into XML format.

At step 438, a check is performed to ascertain if the one or more headers in the header row match with the one or more pre-stored headers. If it is ascertained that the one or more headers in the header row do not match with the one or more pre-stored headers then at step 440, the one or more unmatched headers are renamed. The one or more unmatched headers are renamed using the one or more pre-determined header names having their corresponding one or more pre-stored XML elements used for XML conversion. Once the one or more unmatched headers are renamed, control is transferred to step 442 for converting the insurance data into XML format.

Previously at step 438, if it is ascertained that the one or more headers in the header row match with the one or more pre-stored headers then also control is transferred to step 442 for converting the insurance data into XML format.

At step 442, the insurance data corresponding to the one or more pre-stored matched headers and the one or more renamed headers is converted into XML format using the one or more pre-stored XML elements corresponding to the one or more matched headers and the one or more renamed headers. Further, each of the one or more pre-stored XML elements has its corresponding transformation file which is used for converting the insurance data into XML format.

Figure 5:
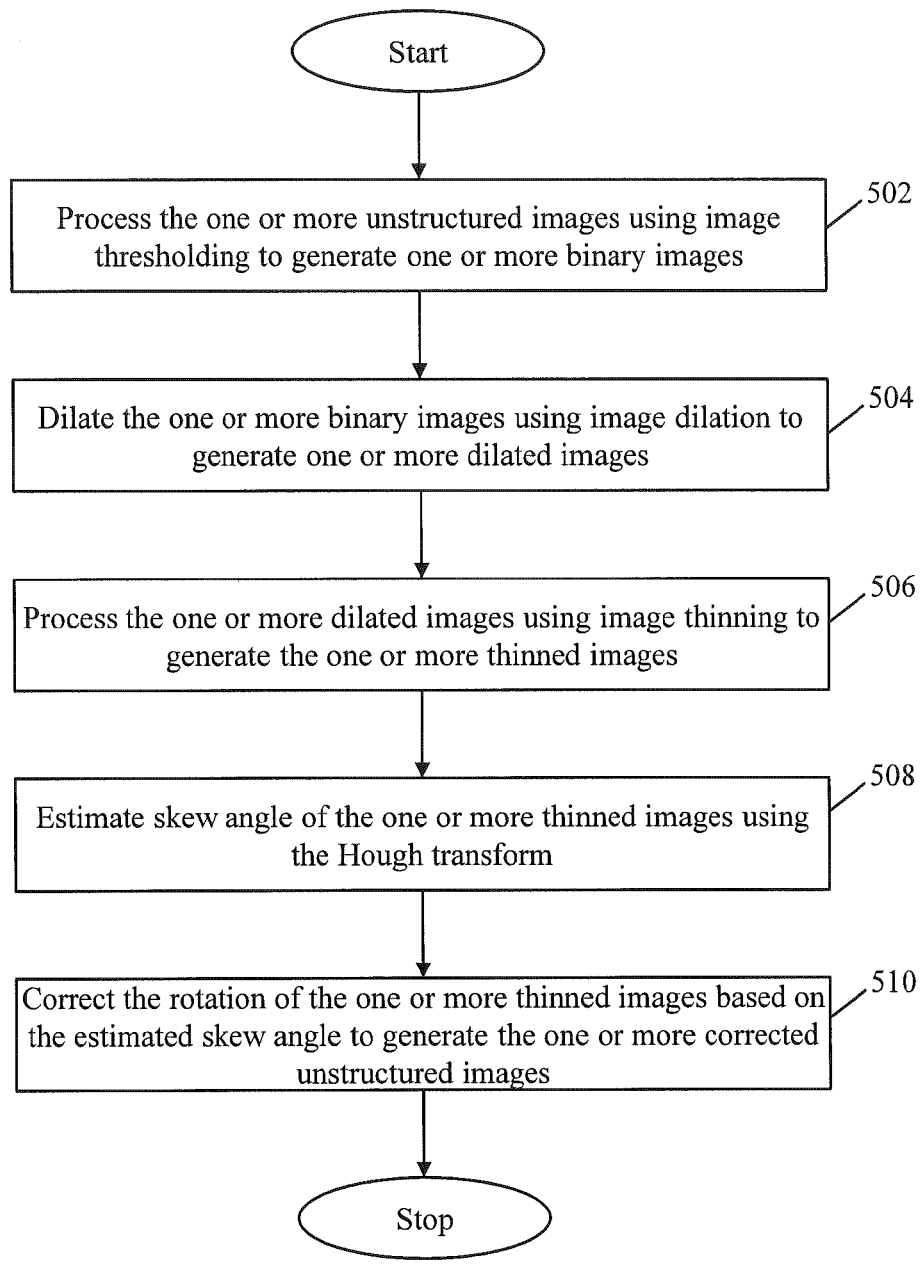
FIG. 5 represents a detailed flowchart to correct rotation of one or more unstructured images, in accordance with an embodiment of the present invention.

FIG. 5 represents a detailed flowchart to correct rotation of one or more unstructured images, in accordance with an embodiment of the present invention.

At step 502, the one or more unstructured images are processed using image thresholding to generate one or more binary images. In an embodiment of the present invention, the one or more unstructured images are in the form of one or more gray scale images. Further, image thresholding facilitates image segmentation by converting the one or more gray scale images into the one or more binary images. In an embodiment of the present invention, image segmentation is the process of partitioning the one or more unstructured images into multiple segments made up of pixels which helps in easier analysis of the one or more binary images. Image segmentation also facilitates in locating objects and boundaries in the one or more binary images.

At step 504, the one or more binary images are dilated using image dilation to generate one or more dilated images. In an embodiment of the present invention, the one or more binary images are dilated to expand the objects and shapes in the one or more binary images.

At step 506, the one or more dilated images are processed using image thinning to generate the one or more thinned images. Further, image thinning facilitates image skeletonization which helps in pattern recognition and feature extraction from the one or more dilated images. Furthermore, image thinning is used to remove foreground pixels from the one or more dilated images.

At step 508, skew angle of the one or more thinned images is estimated using the Hough transform. In an embodiment of the present invention, the skew angle is the angle that the text lines in the one or more thinned images make with the horizontal direction.

At step 510, the rotation of the one or more thinned images is corrected based on the estimated skew angle to generate the one or more corrected unstructured images. In an embodiment of the present invention, the skew angle is corrected by using various rotation correction algorithms that rotate the one or more thinned images to correct the skew based on the estimated skew angle to generate the one or more corrected unstructured images.

Figure 6A:
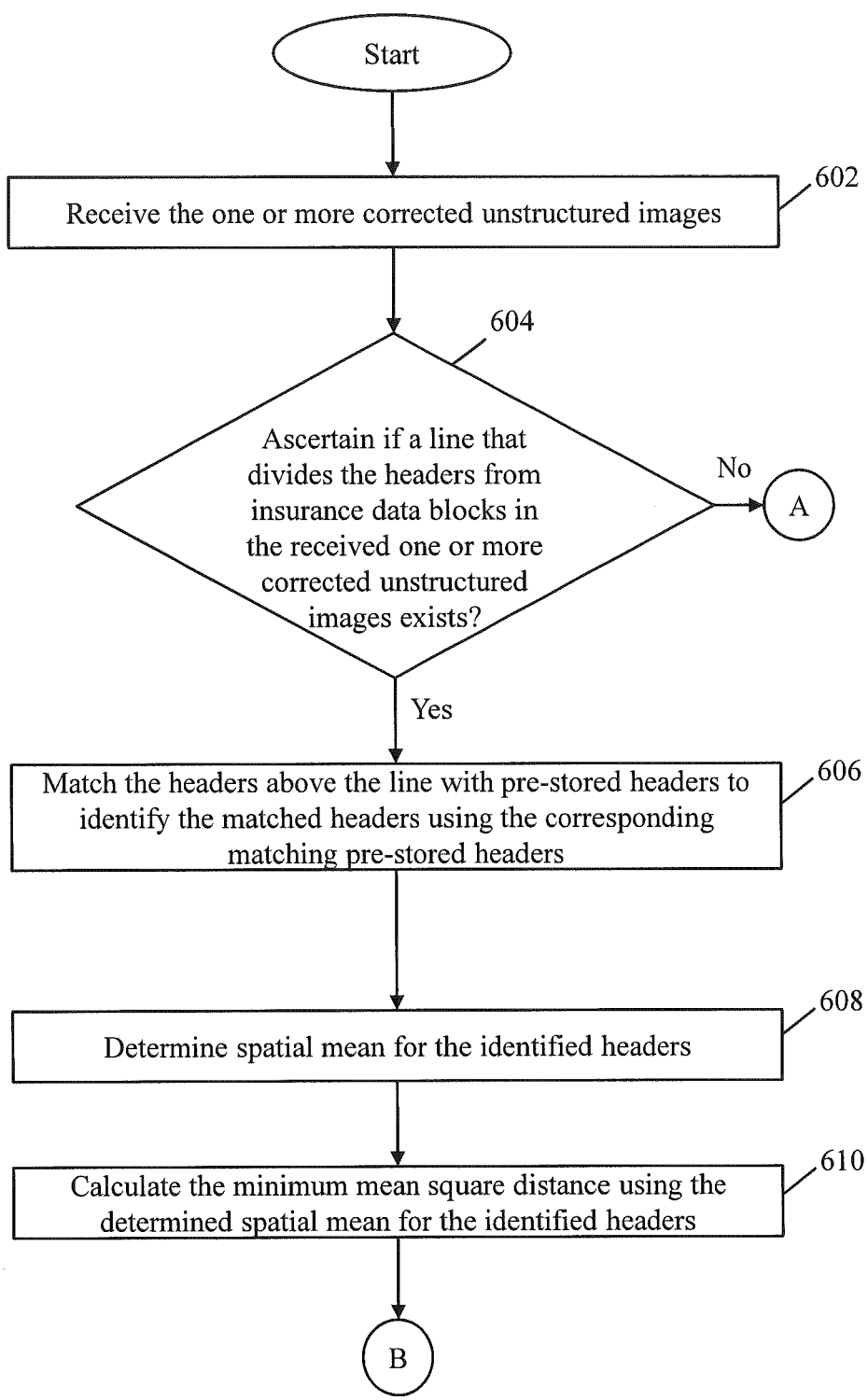
FIGS. 6A and 6B represent a detailed flowchart to determine pattern of one or more corrected unstructured images, in accordance with an embodiment of the present invention.
Figure 6B:
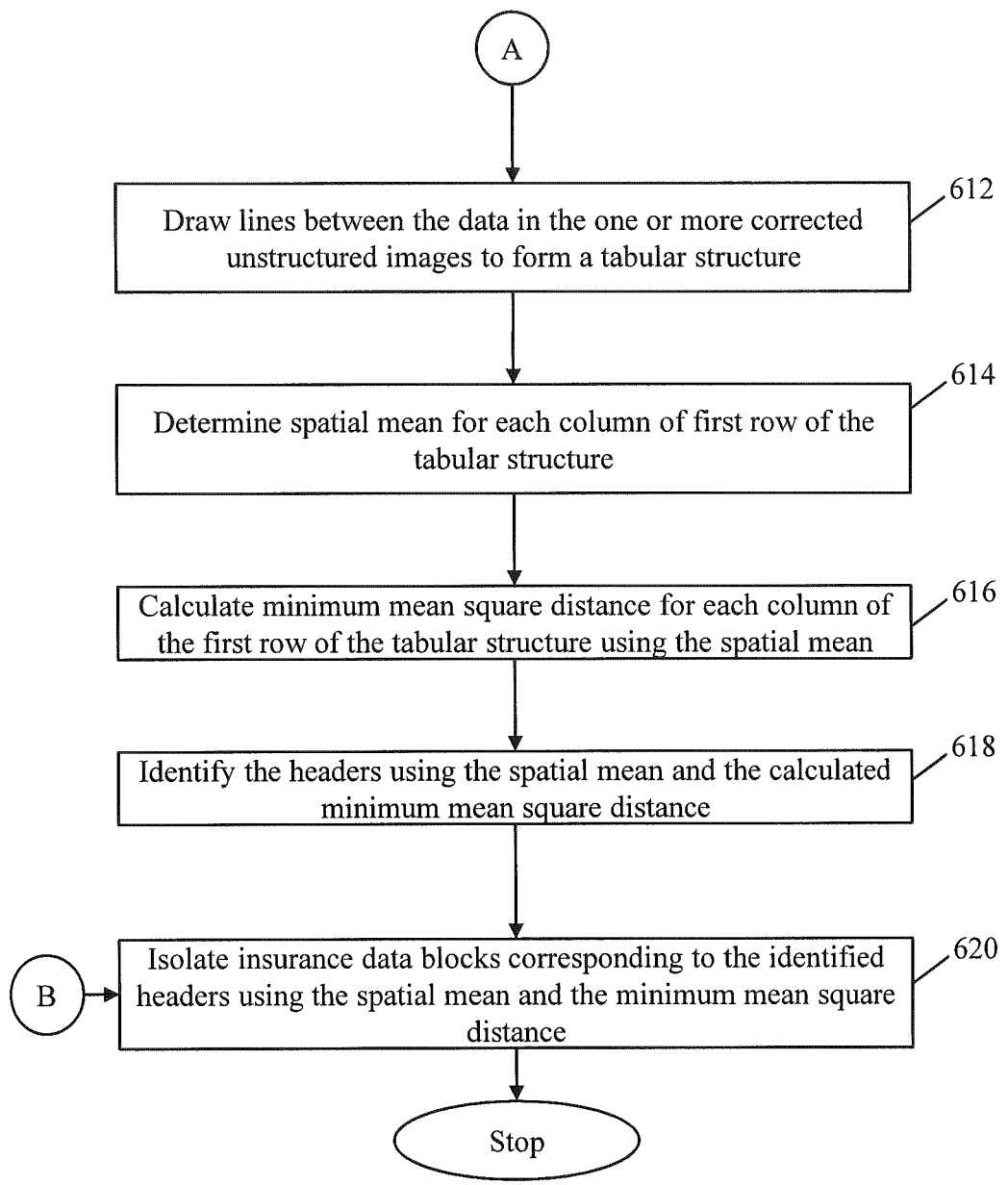

FIGS. 6A and 6B represent a detailed flowchart to determine pattern of one or more corrected unstructured images, in accordance with an embodiment of the present invention.

At step 602, the one or more corrected unstructured images are received.

At step 604, a check is performed to ascertain if a line exists that divides the one or more headers from the one or more insurance data blocks in the received one or more corrected unstructured images. If it is ascertained that the line that divides the one or more headers from the one or more insurance data blocks exists, then at step 606, the one or more headers above the line are matched with the one or more pre-stored headers in the headers repository to identify the one or more matched headers using the corresponding one or more matching pre-stored headers. In an embodiment of the present invention, if a header above the line does not match with the one or more pre-stored headers then the unmatched header is joined with an adjacent matched header.

At step 608, the spatial mean for the one or more identified headers is determined. In an embodiment of the present invention, the spatial mean for the one or more identified headers is determined using various spatial mean calculation algorithms and filters. In an embodiment of the present invention, the one or more matched pre-stored headers have corresponding pre-stored position information. The pre-stored position information includes, but is not limited to, minimum and maximum values of the X and Y co-ordinates of the one or more pre-stored headers and corresponding insurance data. In an exemplary embodiment of the present invention, the spatial mean is determined by the spatial mean calculation algorithms using the following mathematical formula:

Spatial Mean for X Co-Ordinate:

$$\text{mean}X = (\min X + \max X)/2,$$

wherein minX and maxX are minimum and maximum values of the X co-ordinate and meanX is spatial mean for X co-ordinate for a particular header.

Spatial Mean for Y Co-Ordinate:

$$\text{mean}Y = (\min Y + \max Y)/2,$$

wherein minY and maxY are minimum and maximum values of the Y co-ordinate and meanY is spatial mean for Y co-ordinate for a particular header.

At step 610, the minimum mean square distance is calculated using the determined spatial mean for the one or more identified headers. In an embodiment of the present invention, the minimum mean square distance is calculated using various algorithms and filters. In an exemplary embodiment of the present invention, the minimum mean square distance may be calculated using various MATLAB functions. Once the minimum mean square distance for the identified one or more headers is calculated, the control is transferred to step 620.

Previously at step 604, if it is determined that the line that divides the one or more headers from the one or more insurance data blocks in the one or more corrected unstructured images does not exist, then at step 612, lines are drawn between the data in the one or more corrected unstructured images to form a tabular structure.

At step 614, spatial mean for each column of first row of the tabular structure is determined using appropriate algorithms. In an exemplary embodiment of the present invention, the spatial mean for each column of the first row is determined by spatial mean calculation algorithms using the following mathematical formula:

Spatial Mean for X Co-Ordinate:

$$\text{mean}X = (\min X + \max X)/2,$$

wherein minX and maxX are minimum and maximum values of the X co-ordinate and meanX is spatial mean for X co-ordinate for a particular column.

Spatial Mean for Y Co-Ordinate:

$$\text{mean}Y = (\min Y + \max Y)/2,$$

wherein minY and maxY are minimum and maximum values of the Y co-ordinate and meanY is spatial mean for Y co-ordinate for a particular column.

At step 616, minimum mean square distance for the each column of the first row of the tabular structure is calculated using the spatial mean.

At step 618, the one or more headers are identified using the spatial mean and the calculated minimum mean square distance.

At step 620, the one or more insurance data blocks corresponding to the one or more identified headers are isolated using the spatial mean and the calculated minimum mean square distance.

Figure 7:
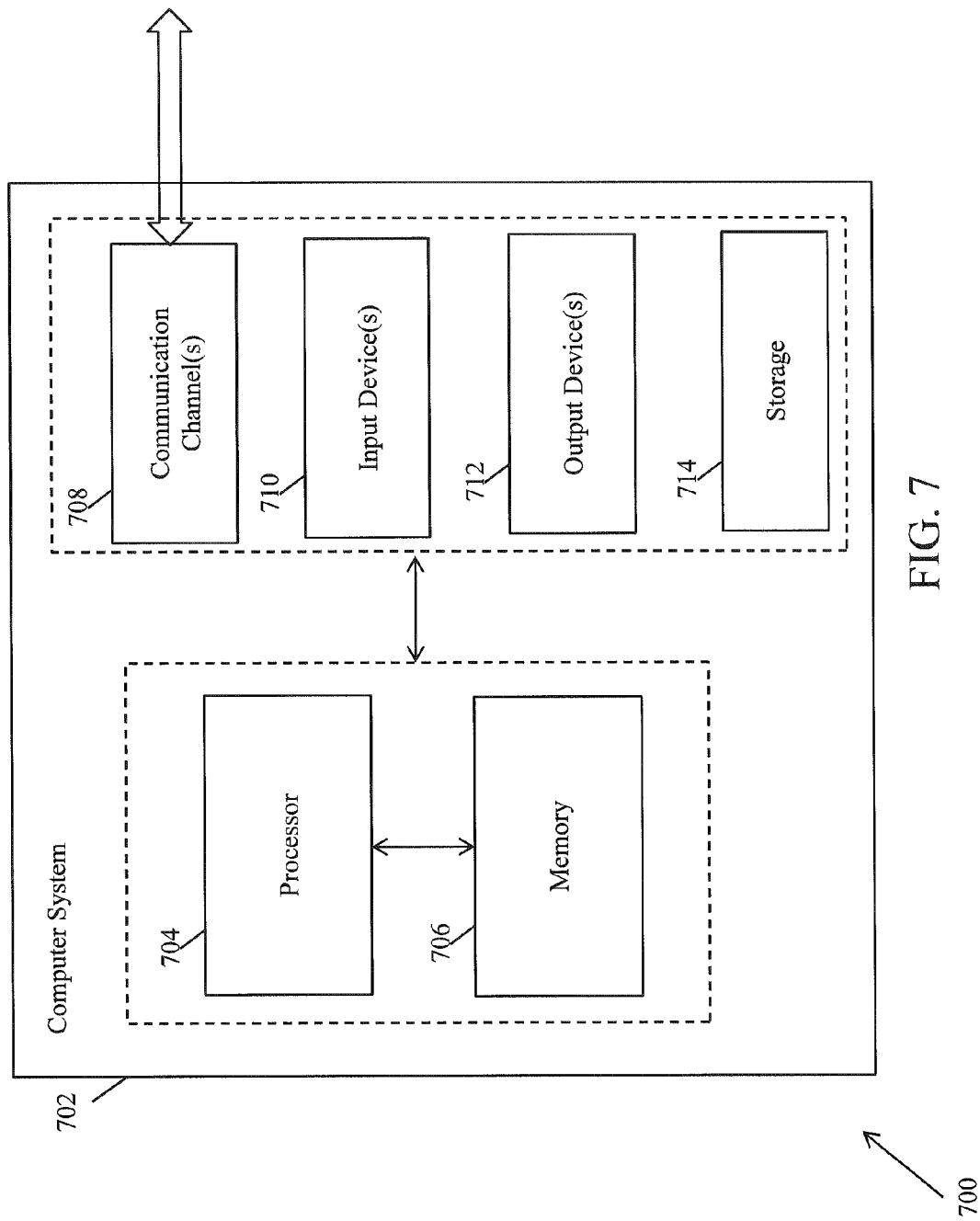
FIG. 7 illustrates an exemplary computer system in which various embodiments of the present invention may be implemented.

FIG. 7 illustrates an exemplary computer system in which various embodiments of the present invention may be implemented.

The computer system 702 comprises a processor 704 and a memory 706. The processor 704 executes program instructions and may be a real processor. The processor 704 may also be a virtual processor. The computer system 702 is not intended to suggest any limitation as to scope of use or functionality of described embodiments. For example, the computer system 702 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 706 may store software for implementing various embodiments of the present invention. The computer system 702 may have additional components. For example, the computer system 702 includes one or more communication channels 708, one or more input devices 710, one or more output devices 712, and storage 714. An interconnection mechanism (not shown) such as a bus, controller, or network, interconnects the components of the computer system 702. In various embodiments of the present invention, operating system software (not shown) provides an operating environment for various softwares executing in the computer system 702, and manages different functionalities of the components of the computer system 702.

The communication channel(s) 708 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 710 may include, but not limited to, a keyboard, mouse, pen, joystick, trackball, a voice device, a scanning device, or any another device that is capable of providing input to the computer system 702. In an embodiment of the present invention, the input device(s) 710 may be a sound card or similar device that accepts audio input in analog or digital form. The output device(s) 712 may include, but not limited to, a user interface on CRT or LCD, printer, speaker, CD/DVD writer, or any other device that provides output from the computer system 702.

The storage 714 may include, but not limited to, magnetic disks, magnetic tapes, CD-ROMs, CD-RWs, DVDs, flash drives or any other medium which can be used to store information and can be accessed by the computer system 702. In various embodiments of the present invention, the storage 714 contains program instructions for implementing the described embodiments.

The present invention may suitably be embodied as a computer program product for use with the computer system 702. The method described herein is typically implemented as a computer program product, comprising a set of program instructions which is executed by the computer system 702 or any other similar device. The set of program instructions may be a series of computer readable codes stored on a tangible medium, such as a computer readable storage medium (storage 714), for example, diskette, CD-ROM, ROM, flash drives or hard disk, or transmittable to the computer system 702, via a modem or other interface device, over either a tangible medium, including but not limited to optical or analogue communications channel(s) 708. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be utilized in various other industries and organizations including, but not limited to, healthcare, banking and financial where large amount of data from various documents in varied file formats is to be managed and processed.

In an embodiment of the present invention, healthcare organizations can automatically extract patient data from various healthcare related documents having one or more file formats and upload the extracted data into healthcare systems such as, but not limited, Health Information Management (HIM) systems, Electronic Health Record (EHR) systems and Electronic Medical Record (EMR) systems. In another embodiment of the present invention, financial and banking organizations can automatically extract data from various banking related documents and financial documents having one or more file formats. Further, the extracted data can be uploaded into the banking and financial systems to increase business efficiency and improve customer service.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A system for extracting insurance data from one or more documents having one or more file formats and converting the data into Extensible Markup Language (XML) format, the system comprising:

a memory comprising program instructions defining a user interface, a business type classification module, a format classification module and an extraction and conversion module;

a processor configured to execute the program instructions stored in the memory;

the user interface configured to facilitate one or more users submitting one or more documents related to insurance;

the business type classification module in communication with the processor and configured to identify the one or more submitted documents based on a business type;

the format classification module in communication with the processor and configured to identify file format of the one or more submitted documents; and the extraction and conversion module in communication with the processor and configured to:

match one or more headers in the one or more submitted documents with one or more pre-stored headers corresponding to the identified business type, wherein in the event that the one or more headers are not distinctive from the insurance data, a tabular structure is formed from the insurance data, and the one or more headers are identified for carrying out the matching step, by calculating the minimum mean square distance for each column of the first row of the tabular structure using spatial mean;

extract insurance data corresponding to the one or more matched headers, wherein the matching and extracting is based on the identified file format; and convert the extracted insurance data into XML format using one or more pre-stored XML elements corresponding to the one or more matched headers.

2. The system of claim 1, wherein the extraction and conversion module comprises:

an image convertor configured to convert one or more Portable Document Format (PDF) files to one or more images if the identified file format of the one or more submitted documents is PDF;

an image processing module configured to process the one or more images to isolate one or more insurance data blocks, wherein the one or more images are received from at least one of: the image convertor and directly from the one or more users after being identified by the format classification module;

a data extractor configured to extract the insurance data from at least one of:

the isolated one or more insurance data blocks; and one or more spreadsheets in the form of a two dimensional array if the identified file format of the one or more submitted documents is in a spreadsheet format; and an XML convertor configured to convert the extracted insurance data using the one or more pre-stored XML elements.

3. The system of claim 1, wherein the extraction and conversion module further comprises:

a data cleansing module configured to cleanse the extracted insurance data from the one or more spreadsheets; and a data structuring module configured to match the cleansed insurance data with the one or more pre-stored headers to identify header row, the one or more headers and the corresponding insurance data.

4. The system of claim 3, wherein cleansing the extracted insurance data comprises removing at least one of: rows and columns that contain data elements less than a predetermined threshold value, duplicate data and unwanted data.

5. The system of claim 2, wherein processing the one or more images to isolate the one or more insurance data blocks by the image processing module comprises:
   determining the structure of the one or more images by matching the one or more images with one or more pre-stored empty templates corresponding to the identified business type, wherein if the one or more images match with the one or more pre-stored empty templates then the one or more images are considered to be structured;
   correcting at least one of: rotation, scale and translation of the one or more structured images to fit the one or more matched empty templates;
   matching the one or more headers from the one or more corrected images with the one or more pre-stored headers corresponding to the one or more matched empty templates;
   isolating the one or more insurance data blocks corresponding to the one or more matched headers from the one or more corrected structured images.

6. The system of claim 2, wherein processing the one or more images to isolate the one or more insurance data blocks by the image processing module comprises:
   determining the structure of the one or more images by matching the one or more images with one or more pre-stored empty templates corresponding to the identified business type, wherein if the one or more images do not match with the one or more pre-stored empty templates then the one or more images are considered to be unstructured;
   correcting the rotation of the one or more unstructured images;
   determining the pattern of the one or more corrected unstructured images, wherein the determined pattern is an arrangement of the one or more headers and the corresponding insurance data in the one or more corrected unstructured images;
   matching the one or more headers from the one or more corrected unstructured images with the one or more pre-stored headers using the determined pattern;
   isolating one or more insurance data blocks corresponding to the one or more matched headers from the one or more corrected unstructured images using the determined pattern.

7. The system of claim 1 further comprising a submission channels interface configured to facilitate submitting the one or more documents related to insurance directly via one or more submission channels.

8. The system of claim 7, wherein the one or more submission channels comprise at least one of: a facsimile, an e-mail, an instant message and a digital scanner.

9. The system of claim 1, wherein the business type refers to the type of the one or more submitted documents corresponding to a line of insurance business comprising at least one of: Association for Cooperative Operations Research and Development (ACORD) forms, Cisgem forms, schedules, loss run reports, Market Value Reduction (MVR) reports and addendums to insurance policy.

10. The system of claim 2, wherein the one or more images have one or more image file formats comprising at least one of: a Joint Photographic Experts Group (JPEG) format, a JPEG File Interchange Format (JFIF), an Exchangeable Image File Format (EXIF), a Tagged Image File Format (TIFF), a Graphics Interchange Format (GIF), a bitmap image file format, a Portable Network Graphics (PNG) format and any other image file format.

11. The system of claim 2, wherein the one or more spreadsheets have one or more spreadsheet formats.

12. The system of claim 1, wherein each of the one or more pre-stored XML elements are XML transformations corresponding to the one or more pre-stored headers.

13. A computer-implemented method for extracting insurance data from one or more documents having one or more file formats and converting the data into Extensible Markup Language (XML) format, via program instructions stored in a memory and executed by a processor, the computer-implemented method comprising:
   submitting one or more documents related to insurance;
   identifying the one or more submitted documents based on a business type;
   identifying the file format of the one or more submitted documents;
   matching one or more headers in the one or more submitted documents with one or more pre-stored headers corresponding to the identified business type based on the identified file format, wherein in the event that the one or more headers are not distinctive from the insurance data, a tabular structure is formed from the insurance data, and the one or more headers are identified for carrying out the matching step, by calculating the minimum mean square distance for each column of the first row of the tabular structure using spatial mean;
   extracting insurance data corresponding to the one or more matched headers, wherein the extraction of the insurance data is based on the identified file format; and
   converting the extracted insurance data into XML format using one or more pre-stored XML elements corresponding to the one or more matched headers.

14. The computer-implemented method of claim 13, wherein the method for extracting the insurance data from the one or more documents having one or more file formats and converting into Extensible Markup Language (XML) format further comprises:
   converting one or more PDF files into one or more images if the identified file format of the one or more submitted documents is PDF;
   processing the one or more images to isolate one or more insurance data blocks, wherein the one or more images comprise at least one of:
      the one or more converted images, and
      the one or more submitted documents identified as the one or more images;
   extracting the insurance data from the isolated insurance data blocks; and
   converting the extracted insurance data using the one or more pre-stored XML elements.

15. The computer-implemented method of claim 14, wherein the step of processing the one or more images to isolate the one or more insurance data blocks further comprises:
   determining the structure of the one or more images by matching the one or more images with one or more pre-stored empty templates corresponding to the identified business type, wherein if the one or more images match with the one or more pre-stored empty templates then the one or more images are considered to be structured;
   correcting at least one of: rotation, scale and translation of the one or more structured images to fit the one or more matched empty templates;

matching the one or more headers from the one or more corrected structured images with the one or more pre-stored headers corresponding to the one or more matched empty templates; and isolating the one or more insurance data blocks corresponding to the one or more matched headers from the one or more corrected structured images.

16. The computer-implemented method of claim 14, wherein the step of processing the one or more images to isolate the one or more insurance data blocks further comprises:

determining the structure of the one or more images by matching the one or more images with one or more pre-stored empty templates corresponding to the identified business type, wherein if the one or more images do not match with the one or more pre-stored empty templates then the one or more images are considered to be unstructured;

correcting the rotation of the one or more unstructured images;

determining the pattern of the one or more corrected unstructured images, wherein the determined pattern is an arrangement of the one or more headers and the corresponding insurance data in the one or more corrected unstructured images;

matching the one or more headers from the one or more corrected unstructured images with the one or more pre-stored headers using the determined pattern; and isolating the one or more insurance data blocks corresponding to the one or more matched headers from the one or more corrected unstructured images using the determined pattern.

17. The computer-implemented method of claim 16, wherein the step of correcting the rotation of the one or more unstructured images comprises:

processing the one or more unstructured images using image thresholding to generate one or more binary images, wherein the image thresholding facilitates image segmentation by converting the one or more unstructured images in the form of one or more gray scale images into the one or more binary images;

dilating the one or more binary images using image dilation to generate one or more dilated images, wherein dilating the one or more binary images facilitates in expanding objects and shapes in the one or more binary images;

processing the one or more dilated images using image thinning to generate one or more thinned images, wherein thinning the one or more dilated images facilitates image skeletonization;

estimating a skew angle of the one or more thinned images using Hough transform; and correcting the rotation of the one or more thinned images based on the estimated skew angle to generate the one or more corrected unstructured images.

18. The computer-implemented method of claim 13, wherein the method for extracting the insurance data from the one or more documents having one or more file formats and converting into Extensible Markup Language (XML) format further comprises:

extracting the insurance data from one or more spreadsheets in the form of a two dimensional array if the identified file format of the one or more submitted documents is a spreadsheet format;

cleansing the extracted insurance data, wherein the extracted insurance data is cleansed by removing at least one of: rows and columns that contain data elements less than a predetermined threshold value, duplicate data and unwanted data;

matching the cleansed insurance data with the one or more pre-stored headers to identify header row, the one or more headers and the corresponding insurance data;

matching the one or more headers in the header row with the one or more pre-stored headers, wherein if the one or more headers in the header row do not match with the one or more pre-stored headers then the one or more unmatched headers are renamed; and converting the insurance data corresponding to at least one of: the one or more matched headers and the one or more renamed headers into XML format using the one or more pre-stored XML elements corresponding to the one or more matched headers and the one or more renamed headers respectively.

19. The computer-implemented method of claim 13, wherein the one or more documents are submitted via at least one of: a user interface and a submission channels interface.

20. A computer program product for extracting insurance data from one or more documents having one or more file formats and converting the data into Extensible Markup Language (XML) format, the computer program product comprising:

a non-transitory computer-readable medium having computer-readable program code stored thereon, the computer-readable program code comprising instructions that when executed by a processor, cause the processor to:

submit one or more documents related to insurance;

identify the one or more submitted documents based on a business type;

identify the file format of the one or more submitted documents;

match one or more headers in the one or more submitted documents with one or more pre-stored headers corresponding to the identified business type based on the identified file format, wherein in the event that the one or more headers are not distinctive from the insurance data, a tabular structure is formed from the insurance data and the one or more headers are identified for carrying out the matching step, by calculating the minimum mean square distance for each column of the first row of the tabular structure using spatial mean;

extract insurance data corresponding to the one or more matched headers, wherein the extraction of the insurance data is based on the identified file format; and convert the extracted insurance data into XML format using one or more pre-stored XML elements corresponding to the one or more matched headers.

21. The computer program product of claim 20, wherein extracting the insurance data from the one or more documents having one or more file formats and converting into XML format further comprises:

converting one or more PDF files into one or more images if the identified file format of the one or more submitted documents is PDF;

processing the one or more images to isolate one or more insurance data blocks, wherein the one or more images comprise at least one of:

the one or more converted images; and the one or more submitted documents identified as the one or more images;

extracting the insurance data from the isolated insurance data blocks; and converting the extracted insurance data using the one or more pre-stored XML elements.

22. The computer program product of claim 21, wherein processing the one or more images to isolate the one or more insurance data blocks further comprises:
   determining the structure of the one or more images by matching the one or more images with one or more pre-stored empty templates corresponding to the identified business type, wherein if the one or more images match with the one or more pre-stored empty templates then the one or more images are considered to be structured;
   correcting at least one of: rotation, scale and translation of the one or more structured images to fit the one or more matched empty templates;
   matching the one or more headers from the one or more corrected structured images with the one or more pre-stored headers corresponding to the one or more matched empty templates; and
   isolating the one or more insurance data blocks corresponding to the one or more matched headers from the one or more corrected structured images.

23. The computer program product of claim 21, wherein processing the one or more images to isolate the one or more insurance data blocks further comprises:
   determining the structure of the one or more images by matching the one or more images with one or more pre-stored empty templates corresponding to the identified business type, wherein if the one or more images do not match with the one or more pre-stored empty templates then the one or more images are considered to be unstructured;
   correcting the rotation of the one or more unstructured images;
   determining the pattern of the one or more corrected unstructured images, wherein the determined pattern is an arrangement of the one or more headers and the corresponding insurance data in the one or more corrected unstructured images;
   matching the one or more headers from the one or more corrected unstructured images with the one or more pre-stored headers using the determined pattern; and
   isolating the one or more insurance data blocks corresponding to the one or more matched headers from the one or more corrected unstructured images using the determined pattern.

24. The computer program product of claim 23, wherein correcting the rotation of the one or more unstructured images comprises:
   processing the one or more unstructured images using image thresholding to generate one or more binary images, wherein the image thresholding facilitates image segmentation by converting the one or more unstructured images in the form of one or more gray scale images into the one or more binary images;
   dilating the one or more binary images using image dilation to generate one or more dilated images, wherein dilating the one or more binary images facilitates in expanding objects and shapes in the one or more binary images;
   processing the one or more dilated images using image thinning to generate one or more thinned images, wherein thinning the one or more dilated images facilitates image skeletonization;
   estimating a skew angle of the one or more thinned images using Hough transform; and
   correcting the rotation of the one or more thinned images based on the estimated skew angle to generate the one or more corrected unstructured images.

25. The computer program product of claim 20, wherein extracting the insurance data from the one or more documents having one or more file formats and converting into XML format further comprises:
   extracting the insurance data from one or more spreadsheets in the form of a two dimensional array if the identified file format of the one or more submitted documents is in a spreadsheet format;
   cleansing the extracted insurance data, wherein the extracted insurance data is cleansed by removing at least one of: rows and columns that contain data elements less than a predetermined threshold value, duplicate data and unwanted data;
   matching the cleansed insurance data with the one or more pre-stored headers to identify header row, the one or more headers and the corresponding insurance data;
   matching the one or more headers in the header row with the one or more pre-stored headers, wherein if the one or more headers in the header row do not match with the one or more pre-stored headers then the one or more unmatched headers are renamed; and
   converting the insurance data corresponding to at least one of: the one or more matched headers and the one or more renamed headers into XML format using the one or more pre-stored XML elements corresponding to the one or more matched headers and the one or more renamed headers respectively.

* * * * *